US012699326B2

(12) United States Patent
De Zwart et al.

(10) Patent No.: US 12,699,326 B2
(45) Date of Patent: Aug. 4, 2026

(54) MAPPING METRICS BETWEEN MANUFACTURING SYSTEMS

(71) Applicant: ASML NETHERLANDS B.V., Veldhoven (NL)

(72) Inventors: Siebe Tjerk De Zwart, Valkenswaard (NL); Remco Dirks, Deurne (NL); Gaurav Nanda, Eindhoven (NL); Bastiaan Onne Fagginger Auer, Eindhoven (NL)

(73) Assignee: ASML NETHERLANDS B.V., Veldhoven (NL)

( * ) Notice: Subject to any disclaimer, the term of this patent is extended or adjusted under 35 U.S.C. 154(b) by 471 days.

(21) Appl. No.: 18/019,968

(22) PCT Filed: Jul. 26, 2021

(86) PCT No.: PCT/EP2021/070842
§ 371 (c)(1),
(2) Date: Feb. 6, 2023

(87) PCT Pub. No.: WO2022/042972
PCT Pub. Date: Mar. 3, 2022

(65) Prior Publication Data
US 2023/0288815 A1 Sep. 14, 2023

(30) Foreign Application Priority Data
Aug. 31, 2020 (EP) .................................... 20193721

(51) Int. Cl.
*G03F 7/00* (2006.01)
*G05B 19/418* (2006.01)
(Continued)

(52) U.S. Cl.
CPC ...... *G03F 7/70525* (2013.01); *G03F 7/70504* (2023.05); *G03F 7/706839* (2023.05);
(Continued)

(58) Field of Classification Search
CPC ............. G03F 7/70525; G03F 7/70504; G03F 7/706839; G03F 7/706845; G03F 7/705;
(Continued)

(56) References Cited

U.S. PATENT DOCUMENTS

| | | |
|---|---|---|
| 6,952,253 B2 | 10/2005 | Lof et al. |
| 2007/0268497 A1 | 11/2007 | Stanke et al. |

(Continued)

FOREIGN PATENT DOCUMENTS

| | | |
|---|---|---|
| EP | 1628164 | 2/2006 |
| EP | 3637186 | 4/2020 |
| WO | 2011/012624 | 2/2011 |

OTHER PUBLICATIONS

International Search Report and Written Opinion issued in corresponding PCT Patent Application No. PCT/EP2021/070842, dated Mar. 3, 2022.

*Primary Examiner* — Christian T Bryant
(74) *Attorney, Agent, or Firm* — Pillsbury Winthrop Shaw Pittman, LLP

(57) ABSTRACT

Methods and systems for determining a mapped intensity metric are described. Determining the mapped intensity metric includes determining an intensity metric for a manufacturing system. The intensity metric is determined based on a reflectivity of a location on a substrate and a manufacturing system characteristic. Determining the mapped intensity metric also includes determining a mapped intensity metric for a reference system. The reference system has a reference system characteristic. The mapped intensity metric is determined based on the intensity metric, the manufacturing system characteristic, and the reference system characteristic, to mimic determination of the intensity metric for the manufacturing system using the reference system. In some embodiments, the reference system is virtual, and the manufacturing system is physical.

20 Claims, 14 Drawing Sheets

(51) Int. Cl.

| | |
|---|---|
| *G06F 30/20* | (2020.01) |
| *G06F 30/398* | (2020.01) |
| *G06F 119/18* | (2020.01) |

(52) U.S. Cl.
CPC ........ *G03F 7/706845* (2023.05); *G03F 7/705* (2013.01); *G05B 19/41885* (2013.01); *G06F 30/20* (2020.01); *G06F 30/398* (2020.01); *G06F 2119/18* (2020.01)

(58) Field of Classification Search
CPC .... G06F 30/398; G06F 30/20; G06F 2119/18; G05B 19/41885
See application file for complete search history.

(56) References Cited

U.S. PATENT DOCUMENTS

| | | |
|---|---|---|
| 2007/0296960 A1 | 12/2007 | Den Boef et al. |
| 2008/0198380 A1 | 8/2008 | Straaijer et al. |
| 2009/0168062 A1 | 7/2009 | Straaijer |
| 2010/0007863 A1 | 1/2010 | Jordanoska |
| 2010/0328655 A1 | 12/2010 | Den Boef |
| 2011/0026032 A1 | 2/2011 | Den Boef et al. |
| 2011/0032500 A1 | 2/2011 | Straaijer |
| 2011/0102753 A1 | 5/2011 | Van De Kerkhof et al. |
| 2011/0102793 A1 | 5/2011 | Straaijer |
| 2011/0188020 A1 | 8/2011 | Den Boef |
| 2011/0249244 A1 | 10/2011 | Leewis et al. |
| 2012/0044470 A1 | 2/2012 | Smilde et al. |
| 2012/0044495 A1 | 2/2012 | Straaijer |
| 2013/0162996 A1 | 6/2013 | Straaijer et al. |
| 2013/0308142 A1 | 11/2013 | Straaijer |
| 2016/0161863 A1 | 6/2016 | Den Boef et al. |
| 2016/0370717 A1 | 12/2016 | Den Boef et al. |
| 2019/0033727 A1* | 1/2019 | Noot ................... G03F 7/70625 |
| 2019/0049859 A1* | 2/2019 | Tsiatmas ............. G03F 7/70633 |
| 2019/0129315 A1* | 5/2019 | Tarabrin ............. G03F 7/70641 |
| 2019/0129316 A1 | 5/2019 | Zhou et al. |
| 2019/0171115 A1* | 6/2019 | Venselaar ............... G03F 7/705 |
| 2019/0204755 A1* | 7/2019 | Kicken ............... G03F 7/70516 |
| 2020/0057386 A1* | 2/2020 | Mossavat ............ G03F 7/70491 |
| 2020/0110341 A1* | 4/2020 | Mossavat ............ G05B 13/027 |
| 2020/0285157 A1* | 9/2020 | Tarabrin ............. G03F 7/70633 |

* cited by examiner

94 ⟶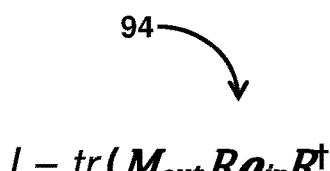

95 ⟶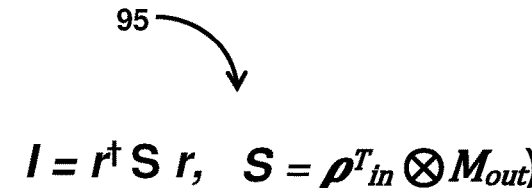

$$I = tr(M_{out} R \rho_{in} R^\dagger)$$

$$I = r^\dagger S r, \quad S = \rho^T_{in} \otimes M_{out})$$

95 ⟶ $I = r^\dagger S r$

Example: find coefficients
that "build" $S_{ref}^{HH}$ from
$S^{HH}, S^{HV}, S^{VH}, S^{VV}$,
And apply to get $I_{ref}^{HH}$.

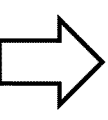

$a_x$    $I^{HH} = r^\dagger S^{HH} r$ $b_x$    $I^{HV} = r^\dagger S^{HV} r$ $c_x$    $I^{VH} = r^\dagger S^{VH} r$ $d_x$    $I^{VV} = r^\dagger S^{VV} r$ $+$    _____

$\approx$    $I_{ref}^{HH} = r^\dagger S_{ref}^{HH} r$

FIG. 9

Given:

$$R = \begin{pmatrix} R_{ss} & R_{sp} \\ R_{ps} & R_{pp} \end{pmatrix} \quad \text{or} \quad r = \begin{pmatrix} R_{ss} \\ R_{ps} \\ R_{sp} \\ R_{pp} \end{pmatrix} \quad \text{and} \quad I = r^{\dagger} S r,$$

$$S_1 = \begin{pmatrix} 1 & 0 & 0 & 0 \\ 0 & 0 & 0 & 0 \\ 0 & 0 & 0 & 0 \\ 0 & 0 & 0 & 0 \end{pmatrix} \Rightarrow I_1 = |R_{ss}|^2$$

$$S_2 = \begin{pmatrix} 0 & 0 & 0 & 0 \\ 0 & 1 & 0 & 0 \\ 0 & 0 & 0 & 0 \\ 0 & 0 & 0 & 0 \end{pmatrix} \Rightarrow I_2 = |R_{ps}|^2$$

$$S_3 = \begin{pmatrix} 0 & 0 & 0 & 0 \\ 0 & 0 & 0 & 0 \\ 0 & 0 & 1 & 0 \\ 0 & 0 & 0 & 0 \end{pmatrix} \Rightarrow I_1 = |R_{sp}|^2$$

$$S_4 = \begin{pmatrix} 0 & 0 & 0 & 0 \\ 0 & 0 & 0 & 0 \\ 0 & 0 & 0 & 0 \\ 0 & 0 & 0 & 1 \end{pmatrix} \Rightarrow I_1 = |R_{pp}|^2$$

MAPPING METRICS BETWEEN MANUFACTURING SYSTEMS

CROSS-REFERENCE TO RELATED APPLICATIONS

This application is the U.S. national phase entry of PCT application No. PCT/EP2021/070842 which was filed on Jul. 26, 2021, which claims priority of European patent application no. 20193721.6 which was filed on Aug. 31, 2020 and which is incorporated herein in its entirety by reference.

TECHNICAL FIELD

This description relates to mapping metrics between manufacturing systems.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as $CD=k_1 \times \lambda/NA$, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but are not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low k1.

SUMMARY

Various metrology operations may be used to measure features of a design. If measured on different metrology systems, the data from a metrology operation on one system may not match the data from the same metrology operation on a different system. Advantageously, the present method(s) and system(s) are configured to provide a generic framework to improve matching between systems by exhaustive use of available system calibration data.

According to an embodiment, there is provided a non-transitory computer readable medium having instructions thereon. The instructions when executed by a computer cause the computer to determine an intensity metric for a manufacturing system. The intensity metric is determined based on a reflectivity of a location on a substrate and a manufacturing system characteristic. The instructions also cause the computer to determine a mapped intensity metric for a reference system. The reference system has a reference system characteristic. The mapped intensity metric is determined based on the intensity metric for the manufacturing system, the manufacturing system characteristic, and the reference system characteristic, to mimic the determination of the intensity metric for the manufacturing system using the reference system.

In some embodiments, the manufacturing system characteristic is a matrix that comprises calibration data for the manufacturing system and the reference system characteristic is a matrix that comprises calibration data for the reference system.

In some embodiments, the mapped intensity metric comprises an intensity metric that would have been observed on the reference system given the reflectivity of the location on the substrate.

In some embodiments, the reference system is virtual, and the manufacturing system is physical.

In some embodiments, determining the mapped intensity metric comprises combining pointwise linear transforms of measured channel intensities, with individual measurement channels characterized by an incoming-outgoing polarization, a grating to sensor rotation, and a wavelength.

In some embodiments, determining the mapped intensity metric comprises mapping individual intensities directly from different points on a pupil, and mapping corresponding intensities from reciprocal points on the pupil.

In some embodiments, determining the mapped intensity metric comprises weighting the intensities directly mapped from the different points on the pupil, and the corresponding intensities from the reciprocal points on the pupil. The weighting is based on calibration data in a manufacturing system matrix and/or a reference system matrix and a corresponding vectorized form of the reflectivity such that individual weights are based on an incoming polarization, an outgoing polarization, a grating to sensor rotation, a reciprocity, and a diffraction order associated with a given intensity.

In some embodiments, the incoming-outgoing polarization comprises horizontal horizontal, vertical horizontal, horizontal vertical, and/or vertical vertical; and the grating to sensor-rotation comprises a given set of angles, and the given set of angles plus 180 degrees.

In some embodiments, the manufacturing system matrix and the reference system matrix form a transform matrix.

In some embodiments, the intensity metric is associated with overlay measured as part of a semiconductor manufacturing process, and the mapped intensity metric is associated with a mapped overlay, such that the mapped overlay can be compared to other mapped overlays from other manufacturing systems also associated with the semiconductor manufacturing process.

According to another embodiment, there is provided a method for determining a mapped intensity metric. The method comprises determining an intensity metric for a manufacturing system. The intensity metric is determined based on a reflectivity of a location on a substrate and a manufacturing system characteristic. The method comprises determining a mapped intensity metric for a reference system. The reference system has a reference system characteristic. The mapped intensity metric is determined based on the intensity metric for the manufacturing system, the manufacturing system characteristic, and the reference system characteristic, to mimic the determination of the intensity metric for the manufacturing system using the reference system.

In some embodiments, the manufacturing system characteristic is a matrix that comprises calibration data for the manufacturing system and the reference system characteristic is a matrix that comprises calibration data for the reference system.

In some embodiments, the mapped intensity metric comprises an intensity metric that would have been observed on the reference system given the reflectivity of the location on the substrate.

In some embodiments, the reference system is virtual, and the manufacturing system is physical.

In some embodiments, determining the mapped intensity metric comprises combining pointwise linear transforms of measured channel intensities, with individual measurement channels characterized by an incoming-outgoing polarization, a grating to sensor rotation, and a wavelength.

In some embodiments, determining the mapped intensity metric comprises mapping individual intensities directly from different points on a pupil, and mapping corresponding intensities from reciprocal points on the pupil.

In some embodiments, determining the mapped intensity metric comprises weighting the intensities directly mapped from the different points on the pupil, and the corresponding intensities from the reciprocal points on the pupil. The weighting is based on calibration data in a manufacturing system matrix and/or a reference system matrix and a corresponding vectorized form of the reflectivity such that individual weights are based on an incoming polarization, an outgoing polarization, a grating to sensor rotation, a reciprocity, and a diffraction order associated with a given intensity.

In some embodiments, the incoming-outgoing polarization comprises horizontal horizontal, vertical horizontal, horizontal vertical, and/or vertical vertical; and the grating to sensor-rotation comprises a set of given angles, and the set of given angles plus 180 degrees.

In some embodiments, the manufacturing system matrix and the reference system matrix form a transform matrix.

In some embodiments, the intensity metric is associated with overlay measured as part of a semiconductor manufacturing process, and the mapped intensity metric is associated with a mapped overlay, such that the mapped overlay can be compared to other mapped overlays from other manufacturing systems also associated with the semiconductor manufacturing process.

According to another embodiment, there is provided a system for determining a mapped intensity metric. The system comprises one or more processors configured by machine readable instructions and/or other components. The one or more processors are configured to determine an intensity metric for a manufacturing system. The intensity metric is determined based on a reflectivity of a location on a substrate and a manufacturing system characteristic. The one or more processors are configured to determine a mapped intensity metric for a reference system. The reference system has a reference system characteristic. The mapped intensity metric is determined based on the intensity metric for the manufacturing system, the manufacturing system characteristic, and the reference system characteristic, to mimic the determination of the intensity metric for the manufacturing system using the reference system.

In some embodiments, the manufacturing system characteristic is a matrix that comprises calibration data for the manufacturing system and the reference system characteristic is a matrix that comprises calibration data for the reference system.

In some embodiments, the mapped intensity metric comprises an intensity metric that would have been observed on the reference system given the reflectivity of the location on the substrate.

In some embodiments, the reference system is virtual, and the manufacturing system is physical.

In some embodiments, determining the mapped intensity metric comprises combining pointwise linear transforms of measured channel intensities, with individual measurement channels characterized by an incoming-outgoing polarization, a grating to sensor rotation, and a wavelength.

In some embodiments, determining the mapped intensity metric comprises mapping individual intensities directly from different points on a pupil, and mapping corresponding intensities from reciprocal points on the pupil.

In some embodiments, determining the mapped intensity metric comprises weighting the intensities directly mapped from the different points on the pupil, and the corresponding intensities from the reciprocal points on the pupil. The weighting is based on calibration data in a manufacturing system matrix and/or a reference system matrix and a corresponding vectorized form of the reflectivity such that individual weights are based on an incoming polarization, an outgoing polarization, a grating to sensor rotation, a reciprocity, and a diffraction order associated with a given intensity.

In some embodiments, the incoming-outgoing polarization comprises horizontal horizontal, vertical horizontal, horizontal vertical, and/or vertical vertical; and the grating to sensor-rotation comprises a set of given angles, and the set of given angles plus 180 degrees.

In some embodiments, the manufacturing system matrix and the reference system matrix form a transform matrix.

In some embodiments, the intensity metric is associated with overlay measured as part of a semiconductor manufacturing process, and the mapped intensity metric is associated with a mapped overlay, such that the mapped overlay can be compared to other mapped overlays from other manufacturing systems also associated with the semiconductor manufacturing process.

According to another embodiment, there is provided a non-transitory computer readable medium for enabling virtual systems to mimic processes on manufacturing systems, the medium having instructions thereon, the instructions when executed by a computer causing the computer to: retrieve a manufacturing system matrix comprising first calibration data for a manufacturing system; determine a reflectivity of a location on a substrate for the manufacturing system; determine an intensity metric for the manufacturing system based on the reflectivity and the manufacturing system matrix, wherein the intensity metric represents an intensity associated with the reflectivity from the location on the substrate; retrieve a virtual system matrix comprising second calibration data for a virtual system, wherein the virtual system is configured to represent a plurality of different manufacturing systems; determine weights, based on the manufacturing system matrix and the virtual system matrix, for mapping intensity metrics of the manufacturing system to respective intensity metrics of the virtual system; and determine a mapped intensity metric for the virtual system based on the weights and the intensity metric to mimic the determination of the intensity metric on the manufacturing system using the virtual system.

In some embodiments, determining the mapped intensity metric comprises combining pointwise linear transforms of measured channel intensities, with individual measurement channels characterized by an incoming-outgoing polarization, a grating to sensor rotation, and a wavelength.

In some embodiments, determining the mapped intensity metric comprises mapping individual intensities directly from different points on a pupil, and mapping corresponding intensities from reciprocal points on the pupil.

In some embodiments, determining the mapped intensity metric comprises weighting the intensities directly mapped from the different points on the pupil, and the corresponding intensities from the reciprocal points on the pupil.

In some embodiments, the incoming-outgoing polarization comprises horizontal horizontal, vertical horizontal, horizontal vertical, and/or vertical vertical; and the grating to sensor-rotation comprises a set of given angles, and the set of given angles plus 180 degrees.

BRIEF DESCRIPTION OF THE DRAWINGS

The accompanying drawings, which are incorporated in and constitute a part of the specification, illustrate one or more embodiments and, together with the description, explain these embodiments. Embodiments of the invention will now be described, by way of example only, with reference to the accompanying schematic drawings in which corresponding reference symbols indicate corresponding parts, and in which:

FIG. 9 shows the basic relations between reflectivity and intensity, according to an embodiment.

FIG. 10A shows an example of a set of "reference" S, according to an embodiment.

DETAILED DESCRIPTION

Figure 1:
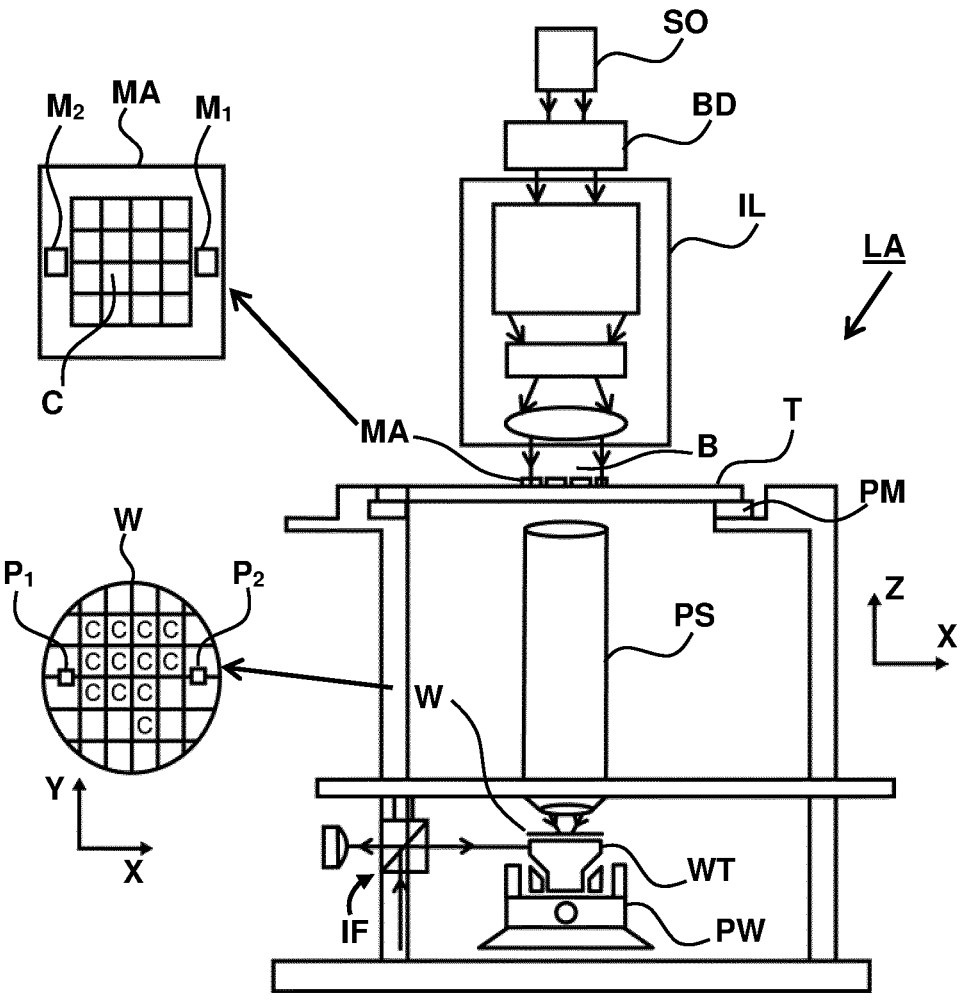
FIG. 1 depicts a schematic overview of a lithographic apparatus, according to an embodiment.

Various metrology operations may be used to measure features of a design. If measured on different metrology systems, the data from a metrology operation on one system may not match the data from the same metrology operation on a different system. For example, in the context of integrated circuits, matching between measured overlay values measured on different overlay measurement systems is often out of specification. A current approach for ensuring that data from different metrology systems is comparable uses the Jones Framework. The Jones-framework is a ray-based framework, which accounts for the polarization state of the light used by the system for measuring (e.g., a light/pupil based metrology system). However, this current approach ignores any phase-shift of the light as it travels through the metrology system and thus it fails to capture phase related differences between systems. However, phase effects are a major source of system-to-system matching issues. For example, the objective retardation (a.k.a. alpha-map) and the phase-induced channel leakage for a given system are thought to be causes of the system-to-system matching issues.

Advantageously, the present method(s) and system(s) are configured to provide a generic framework to improve matching between systems by exhaustive use of available system calibration data. These calibration data are assumed to be present in the form of the incoming and outgoing density matrices (e.g., $\rho_{in}$ and $M_{out}$). In the present method(s) and system(s), an intensity metric (e.g., which may, in some embodiments, be and/or include an intensity image (associated with a pupil), an intensity map, a set of intensity values, and/or other intensity metrics) is determined for a manufacturing system (e.g., a light/pupil based system configured to measure overlay continuing with the example above). The intensity metric is determined based on a reflectivity of a location on a substrate (e.g., a wafer and/or other substrates), a manufacturing system characteristic, and/or other information. A mapped intensity metric for a reference system is determined. The reference system has a reference system characteristic. The mapped intensity metric is determined based on the intensity metric, the manufacturing system characteristic, and the reference system characteristic, to mimic the determination of the intensity metric for the manufacturing system using the reference system. In this way, any number of intensity metrics from any number of manufacturing systems may be mapped to this reference system to facilitate comparison of data from different manufacturing systems.

Although specific reference may be made in this text to the manufacture of ICs, and/or metrology related to the manufacture of IC's, the description herein has many other possible applications. For example, it may be employed in the manufacture of integrated optical systems, guidance and detection patterns for magnetic domain memories, liquid-crystal display panels, thin-film magnetic heads, etc. In these alternative applications, the skilled artisan will appreciate that, in the context of such alternative applications, any use of the terms "reticle", "wafer" or "die" in this text should be considered as interchangeable with the more general terms "mask", "substrate" and "target portion", respectively. In addition, it should be noted that the method described herein may have many other possible applications in diverse fields such as language processing systems, self-driving cars, medical imaging and diagnosis, semantic segmentation, denoising, chip design, electronic design automation, etc. The present method may be applied in any fields where quantifying uncertainty in machine learning model predictions is advantageous.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

A patterning device may comprise, or may form, one or more design layouts. The design layout may be generated utilizing CAD (computer-aided design) programs. This process is often referred to as EDA (electronic design automation). Most CAD programs follow a set of predetermined design rules in order to create functional design layouts/patterning devices. These rules are set based processing and design limitations. For example, design rules define the space tolerance between devices (such as gates, capacitors, etc.) or interconnect lines, to ensure that the devices or lines do not interact with one another in an undesirable way. One or more of the design rule limitations may be referred to as a "critical dimension" (CD). A critical dimension of a device can be defined as the smallest width of a line or hole, or the smallest space between two lines or two holes. Thus, the CD regulates the overall size and density of the designed device. One of the goals in device fabrication is to faithfully reproduce the original design intent on the substrate (via the patterning device).

The term "reticle," "mask," or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective; binary, phase-shifting, hybrid, etc.), examples of other such patterning devices include a programmable mirror array.

As a brief introduction, FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a mask support (e.g., a mask table) T constructed to support a patterning device (e.g., a mask) MA and connected to a first positioner PM configured to accurately position the patterning device MA in accordance with certain parameters, a substrate support (e.g., a wafer table) WT configured to hold a substrate (e.g., a resist coated wafer) W and coupled to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein by reference.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the mask support MT, and is patterned by the pattern (design layout) present on patterning device MA. Having traversed the mask MA, the radiation beam B passes through the projection system PS, which focuses the beam onto a target portion C of the substrate W. With the aid of the second positioner PW and a position measurement system IF, the substrate support WT can be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using mask alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

Figure 2:
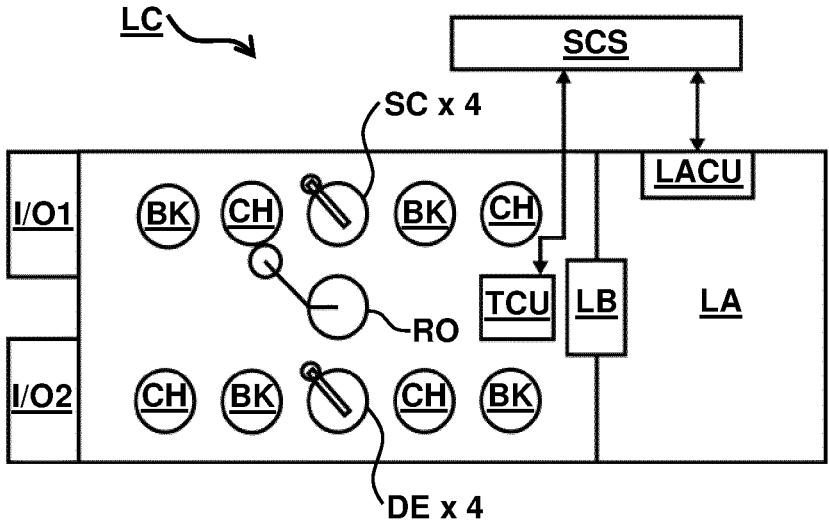
FIG. 2 depicts a schematic overview of a lithographic cell, according to an embodiment.

FIG. 2 depicts a schematic overview of a lithographic cell LC. As shown in FIG. 2 the lithographic apparatus LA may form part of lithographic cell LC, also sometimes referred to as a lithocell or (litho)cluster, which often also includes apparatus to perform pre- and post-exposure processes on a substrate W. Conventionally, these include spin coaters SC configured to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W (FIG. 1) exposed by the lithographic apparatus LA to be exposed correctly and consistently, it is desirable to inspect substrates to measure properties of patterned structures, such as overlay errors between subsequent layers, line thicknesses, critical dimensions (CD), etc. For this purpose, inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W (FIG. 1), and in particular, how properties of different substrates W vary or how properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 3:
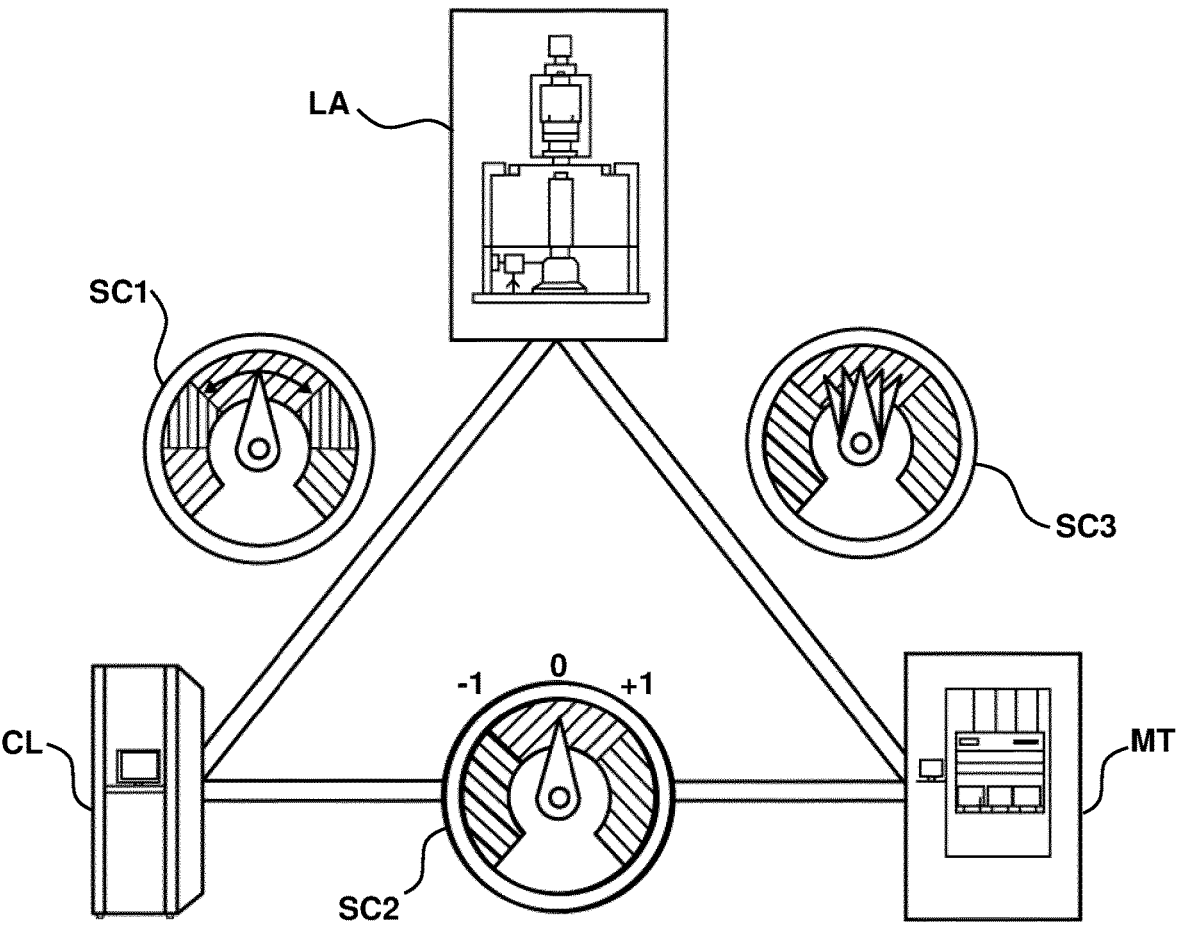
FIG. 3 depicts a schematic representation of holistic lithography, representing a cooperation between three technologies to optimize semiconductor manufacturing, according to an embodiment.

FIG. 3 depicts a schematic representation of holistic lithography, representing a cooperation between three technologies to optimize semiconductor manufacturing. Typically, the patterning process in a lithographic apparatus LA is one of the most critical steps in the processing which requires high accuracy of dimensioning and placement of structures on the substrate W (FIG. 1). To ensure this high accuracy, three systems (in this example) may be combined in a so called "holistic" control environment as schematically depicted in Figure. 3. One of these systems is the lithographic apparatus LA which is (virtually) connected to a metrology apparatus (e.g., a metrology tool) MT (a second system), and to a computer system CL (a third system). A "holistic" environment may be configured to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the process parameters in the lithographic process or patterning process are allowed to vary.

The computer system CL may use (part of) the design layout to be patterned to predict which resolution enhancement techniques to use and to perform computational lithography simulations and calculations to determine which mask layout and lithographic apparatus settings achieve the largest overall process window of the patterning process (depicted in FIG. 3 by the double arrow in the first scale SC1). Typically, the resolution enhancement techniques are arranged to match the patterning possibilities of the lithographic apparatus LA. The computer system CL may also be used to detect where within the process window the lithographic apparatus LA is currently operating (e.g. using input from the metrology tool MT) to predict whether defects may be present due to e.g. sub-optimal processing (depicted in FIG. 3 by the arrow pointing "0" in the second scale SC2).

The metrology apparatus (tool) MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3).

In lithographic processes, it is desirable to make frequent measurements of the structures created, e.g., for process control and verification. Tools to make such measurements include metrology tool (apparatus) MT. Different types of metrology tools MT for making such measurements are known, including scanning electron microscopes or various forms of scatterometer metrology tools MT. Scatterometers are versatile instruments which allow measurements of the parameters of a lithographic process by having a sensor in the pupil or a conjugate plane with the pupil of the objective of the scatterometer, measurements usually referred as pupil based measurements, or by having the sensor in the image plane or a plane conjugate with the image plane, in which case the measurements are usually referred as image or field based measurements. Such scatterometers and the associated measurement techniques are further described in patent applications US20100328655, US2011102753A1, US20120044470A, US20110249244, US20110026032 or EP1,628,164A, incorporated herein by reference in their entirety. Aforementioned scatterometers may measure features of a substrate such as gratings using light from soft x-ray and visible to near-IR wavelength range, for example.

In some embodiments, a scatterometer MT is an angular resolved scatterometer. In these embodiments, scatterometer reconstruction methods may be applied to the measured signal to reconstruct or calculate properties of a grating and/or other features in a substrate. Such reconstruction may, for example, result from simulating interaction of scattered radiation with a mathematical model of the target structure and comparing the simulation results with those of a measurement. Parameters of the mathematical model are adjusted until the simulated interaction produces a diffraction pattern similar to that observed from the real target.

In some embodiments, scatterometer MT is a spectroscopic scatterometer MT. In these embodiments, spectroscopic scatterometer MT may be configured such that the radiation emitted by a radiation source is directed onto target features of a substrate and the reflected or scattered radiation from the target is directed to a spectrometer detector, which measures a spectrum (i.e. a measurement of intensity as a function of wavelength) of the specular reflected radiation. From this data, the structure or profile of the target giving rise to the detected spectrum may be reconstructed, e.g. by Rigorous Coupled Wave Analysis and non-linear regression or by comparison with a library of simulated spectra.

In some embodiments, scatterometer MT is a ellipsometric scatterometer. The ellipsometric scatterometer allows for determining parameters of a lithographic process by measuring scattered radiation for each polarization states. Such a metrology apparatus (MT) emits polarized light (such as linear, circular, or elliptic) by using, for example, appropriate polarization filters in the illumination section of the metrology apparatus. A source suitable for the metrology apparatus may provide polarized radiation as well. Various embodiments of existing ellipsometric scatterometers are described in U.S. patent application Ser. Nos. 11/451,599, 11/708,678, 12/256,780, 12/486,449, 12/920,968, 12/922, 587, 13/000,229, 13/033,135, 13/533,110 and 13/891,410 incorporated herein by reference in their entirety.

In some embodiments, scatterometer MT is adapted to measure the overlay of two misaligned gratings or periodic structures (and/or other target features of a substrate) by measuring asymmetry in the reflected spectrum and/or the detection configuration, the asymmetry being related to the extent of the overlay. The two (typically overlapping) grating structures may be applied in two different layers (not necessarily consecutive layers), and may be formed substantially at the same position on the wafer. The scatterometer may have a symmetrical detection configuration as described e.g. in patent application EP1,628,164A, such that any asymmetry is clearly distinguishable. This provides a way to measure misalignment in gratings. Further examples for measuring overlay may be found in PCT patent application publication no. WO 2011/012624 or US patent application US 20160161863, incorporated herein by reference in their entirety.

Other parameters of interest may be focus and dose. Focus and dose may be determined simultaneously by scatterometry (or alternatively by scanning electron microscopy) as described in US patent application US2011-0249244, incorporated herein by reference in its entirety. A single structure (e.g., feature in a substrate) may be used which has a unique combination of critical dimension and sidewall angle measurements for each point in a focus energy matrix (FEM— also referred to as Focus Exposure Matrix). If these unique combinations of critical dimension and sidewall angle are available, the focus and dose values may be uniquely determined from these measurements.

A metrology target may be an ensemble of composite gratings and/or other features in a substrate, formed by a lithographic process, commonly in resist, but also after etch processes, for example. Typically the pitch and line-width of the structures in the gratings depend on the measurement optics (in particular the NA of the optics) to be able to capture diffraction orders coming from the metrology targets. A diffracted signal may be used to determine shifts between two layers (also referred to 'overlay') or may be used to reconstruct at least part of the original grating as produced by the lithographic process. This reconstruction may be used to provide guidance of the quality of the lithographic process and may be used to control at least part of the lithographic process. Targets may have smaller sub-segmentation which are configured to mimic dimensions of the functional part of the design layout in a target. Due to this sub-segmentation, the targets will behave more similar to the functional part of the design layout such that the overall process parameter measurements resemble the functional part of the design layout. The targets may be measured in an underfilled mode or in an overfilled mode. In the underfilled mode, the measurement beam generates a spot that is smaller than the overall target. In the overfilled mode, the measurement beam generates a spot that is larger than the overall target. In such overfilled mode, it may also be possible to measure different targets simultaneously, thus determining different processing parameters at the same time.

Overall measurement quality of a lithographic parameter using a specific target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may, for example, be a sensitivity of one of the measurement parameters to processing variations. More examples are described in US patent application US2016-0161863 and published US patent application US 2016/0370717A1 incorporated herein by reference in its entirety.

Figure 4:
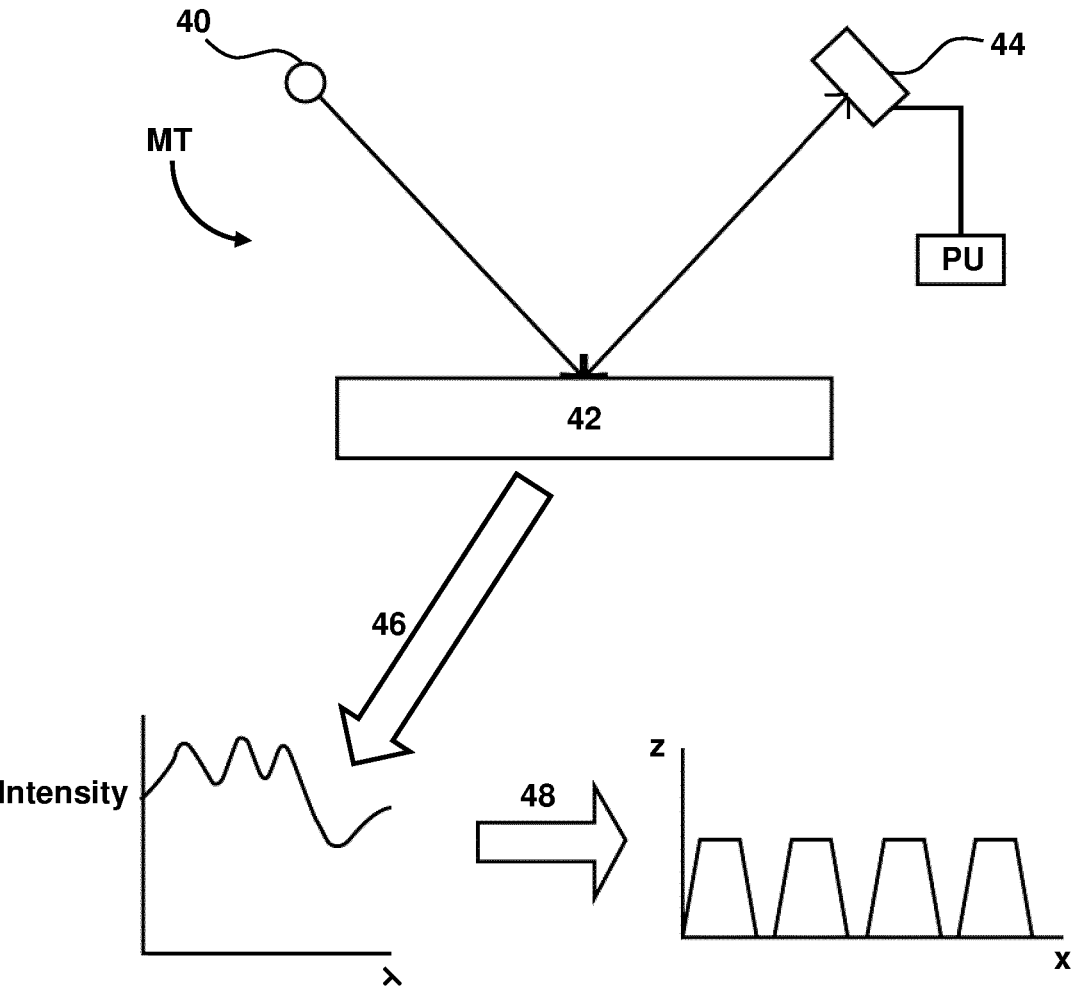
FIG. 4 illustrates an example metrology apparatus, such as a scatterometer, according to an embodiment.

FIG. 4 illustrates an example metrology apparatus (tool) MT, such as a scatterometer. MT comprises a broadband (white light) radiation projector 40 which projects radiation onto a substrate 42. The reflected or scattered radiation is passed to a spectrometer detector 44, which measures a spectrum 46 (i.e. a measurement of intensity as a function of wavelength) of the specular reflected radiation. From this data, the structure or profile giving rise to the detected spectrum may be reconstructed 48 by processing unit PU, e.g. by Rigorous Coupled Wave Analysis and non-linear regression or by comparison with a library of simulated spectra as shown at the bottom of FIG. 4. In general, for the reconstruction, the general form of the structure is known and some parameters are assumed from knowledge of the process by which the structure was made, leaving only a few parameters of the structure to be determined from the scatterometry data. Such a scatterometer may be configured as a normal-incidence scatterometer or an oblique-incidence scatterometer, for example.

It is often desirable to be able computationally determine how a patterning process would produce a desired pattern on a substrate. Computational determination may comprise simulation and/or modeling, for example. Models and/or simulations may be provided for one or more parts of the manufacturing process. For example, it is desirable to be able to simulate the lithography process of transferring the patterning device pattern onto a resist layer of a substrate as well as the yielded pattern in that resist layer after development of the resist, simulate metrology operations such as the determination of overlay, and/or perform other simulations. The objective of a simulation may be to accurately predict, for example, metrology metrics (e.g., overlay, a critical dimension, a reconstruction of a three dimensional profile of features of a substrate, a dose or focus of a lithography apparatus at a moment when the features of the substrate were printed with the lithography apparatus, etc.), manufacturing process parameters (e.g., edge placements, aerial image intensity slopes, sub resolution assist features (SRAF), etc.), and/or other information which can then be used to determine whether an intended or target design has been achieved. The intended design is generally defined as a pre-optical proximity correction design layout which can be provided in a standardized digital file format such as GDSII, OASIS or another file format.

Simulation and/or modeling can be used to determine one or more metrology metrics (e.g., performing overlay and/or other metrology measurements), configure one or more features of the patterning device pattern (e.g., performing optical proximity correction), configure one or more features of the illumination (e.g., changing one or more characteristics of a spatial/angular intensity distribution of the illumination, such as change a shape), configure one or more features of the projection optics (e.g., numerical aperture, etc.), and/or for other purposes. Such determination and/or configuration can be generally referred to as mask optimization, source optimization, and/or projection optimization, for example. Such optimizations can be performed on their own, or combined in different combinations. One such example is source-mask optimization (SMO), which involves the configuring of one or more features of the patterning device pattern together with one or more features of the illumination. The optimizations may use the parameterized model described herein to predict values of various parameters (including images, etc.), for example.

In some embodiments, an optimization process of a system may be represented as a cost function. The optimization process may comprise finding a set of parameters (design variables, process variables, etc.) of the system that minimizes the cost function. The cost function can have any suitable form depending on the goal of the optimization. For example, the cost function can be weighted root mean square (RMS) of deviations of certain characteristics (evaluation points) of the system with respect to the intended values (e.g., ideal values) of these characteristics. The cost function can also be the maximum of these deviations (i.e., worst deviation). The term "evaluation points" should be interpreted broadly to include any characteristics of the system or fabrication method. The design and/or process variables of the system can be confined to finite ranges and/or be interdependent due to practicalities of implementations of the system and/or method. In the case of a lithographic projection apparatus, the constraints are often associated with physical properties and characteristics of the hardware such as tunable ranges, and/or patterning device manufacturability design rules. The evaluation points can include physical points on a resist image on a substrate, as well as non-physical characteristics such as dose and focus, for example.

Figure 5:
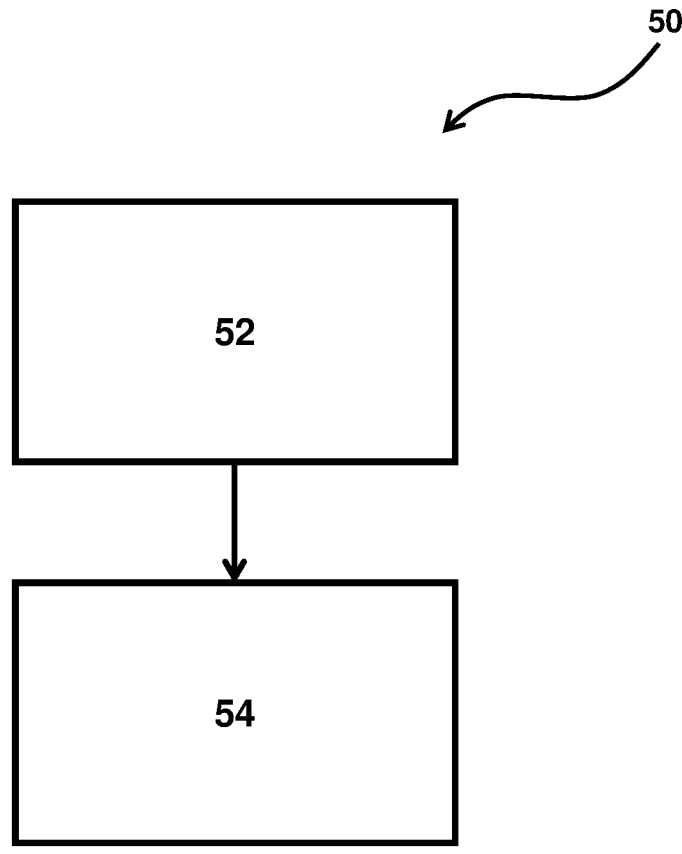
FIG. 5 illustrates a summary of operations of a present method for determining a mapped intensity metric, according to an embodiment.

FIG. 5 illustrates a summary of operations of a present method 50 for determining a mapped intensity metric that can be used for comparison to similar metrics among manufacturing systems (e.g., manufacturing systems such as those shown in FIGS. 4, 3, 2, and/or 1). At an operation 52, an intensity metric for a manufacturing system is determined. At an operation 54, a mapped intensity metric for a reference system is determined. Each of these operations is described in detail below. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 5 and described below is not intended to be limiting. In some embodiments, one or more portions of method 50 may be implemented (e.g., by simulation, modeling, etc.) in one or more processing devices (e.g., one or more processors). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50, for example.

As described above, method 50 (and/or the other methods and systems described herein) is configured to provide a generic framework to improve matching between systems using available system calibration data. These calibration data are assumed to be present in the form of the incoming and outgoing density matrices (e.g., $\rho_{in}$ and $M_{out}$) and/or in other forms. The density matrices are related to the Jones matrices of the incoming (from source to target) and outgoing (from target to detector) optical paths of a manufacturing (e.g., metrology) system. A Jones matrix associated with an optical path describes how the optical electric fields propagates along said path. The associated density matrix is defined as the product of the associated Jones matrix with the conjugate transpose (a.k.a. Hermitian transpose, both designated by "†") of that same Jones matrix. More specifically, $$\rho_{in} = J_{in}J_{in}^{\dagger},$$

and $$M_{out} = J_{out}^{\dagger}J_{out},$$

with $J_{in}J_{out}$ the respective Jones matrices.

In method 50, an intensity metric (e.g., which may, in some embodiments, be and/or include an intensity image (associated with a pupil), an intensity map, a set of intensity values, and/or other intensity metrics) is determined for a manufacturing system (e.g., a light/pupil based system). The intensity metric is determined based on a reflectivity of a location on a substrate (e.g., a wafer and/or other substrates), a manufacturing system characteristic, and/or other information. A corresponding mapped intensity metric for a reference system is determined. The reference system has a reference system characteristic. The manufacturing system characteristic and/or the reference system characteristic may be and/or include one or more matrices comprising calibration data and/or other information for a given system (e.g., as further described below). The mapped intensity metric is determined based on the intensity metric, the manufacturing system characteristic, the reference system characteristic, and/or other information, to mimic the determination of the intensity metric for the manufacturing system using the reference system. In this way, any number of intensity metrics from any number of manufacturing systems may be mapped to this reference system to facilitate comparison of data from different manufacturing systems.

Figure 6:
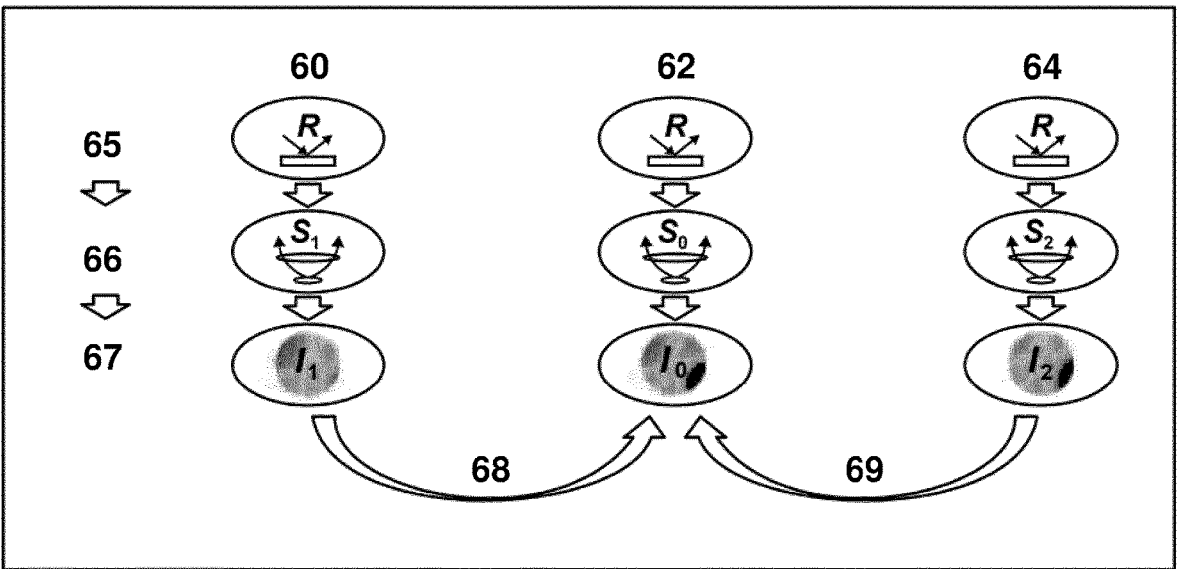
FIG. 6 illustrates mapping intensity metrics from two manufacturing systems to a reference system such that the intensity metrics from the manufacturing systems can be compared, according to an embodiment.

FIG. 6 illustrates these principles with three schematic systems 60, 62, and 64. FIG. 6 illustrates mapping 68, 69 intensity metrics 67 from two manufacturing systems 60 and 64 to a reference system 62 such that the intensity metrics 67 from the manufacturing systems 60, 64 can be compared. Systems 60 and 64 may be and/or include metrology and/or other manufacturing systems. Such systems may be configured to measure overlay, as just one example, and/or other metrics. Such systems may comprise ASML Yieldstar machines, for example. System 60 is indicated by the subscript "1". System 62 may be a reference system indicated by the subscript "0", and system 64 may be indicated by the subscript "2". The systems 60, 62, and 64 are illustrated as measuring 65 a substrate with a certain (complex valued) reflectivity R. One or more system characteristics 66 are illustrated as being embedded in a system matrix S. The resulting measured pupil intensity 67 (e.g., an intensity metric) is represented by I. As shown in FIG. 6, $I_1$ and $I_2$ may be mapped 68, 69 to the reference system 62 to facilitate comparison. The substrate reflectivity itself is not retrieved or reconstructed, but instead the intensity that would have been observed had the intensity metric $I_{1 \, or \, 2}$ been measured on reference system 62 is determined. As shown in FIG. 6, intensity metrics from systems 60 and 64 are mapped to reference system 62, and can be compared on that level.

In some embodiments (as described herein), reference system 62 is an idealized system with predetermined characteristics. The predetermined characteristics may include system operating parameters and/or set points, calibration settings and/or other data, and/or other information. In some embodiments, the predetermined characteristics may be measured for a given manufacturing system, electronically obtained from a manufacturing system and/or electronic storage associated with such a system, programmed by a user (e.g., for a virtual system), assigned by a user, and/or may include other information. In some embodiments, the reference system may be a physical system or a virtual system. In some embodiments, the reference system may represent an average or typical system. In some embodiments, the reference system is configured to represent a plurality of different (physical and/or virtual) manufacturing systems. In some embodiments, the reference system is virtual, and the manufacturing system(s) is (are) physical.

Returning to FIG. 5 and method 50, at an operation 52, an intensity metric for a manufacturing system is determined (e.g., 67 for systems 60 or 64 shown in FIG. 6). The intensity metric (e.g., 67) is determined based on a reflectivity (e.g., 65 shown in FIG. 6) of a location on a substrate (and/or reflectivities of several locations on the substrate), a manufacturing system characteristic (e.g., 66 shown in FIG. 6), and/or other information. In some embodiments, the manufacturing system characteristic is one or more matrices and/or other arrangements of characteristics that comprise calibration data and/or other data for the manufacturing system. The manufacturing system matrix (or matrices) may include any data that may be uniquely associated with a particular manufacturing system so that any variation caused by a manufacturing system itself is represented in, and/or otherwise accounted for by, the manufacturing system matrix (or matrices).

Method 50 combines different "measurement channels", each channel characterized by an incoming-outgoing-polarization and grating-to-sensor-angle (and wavelength), and/or other information. Each channel corresponds to a different set of density matrices (and system matrices) and also to different measured Intensities I. A channel is an aggregate of measured data, calibration data, and labels. It includes a set of points, each point having a position in the pupil-plane, a measured intensity value (all together forming a pupil intensity image), an incoming density matrix, and an outgoing density matrix. Said channel also has labels: the associated incoming polarization value, outgoing polarization value, the wavelength, and a grating-to-sensor angle. Additional aspects of operation 52 are further described below in context with operation 54.

At an operation 54, a mapped intensity metric (e.g., 68 and/or 69 in FIG. 6) for a reference system (e.g., 62 in FIG. 6) is determined. The mapped intensity metric comprises an intensity metric that would have been observed on the reference system given the reflectivity of the location on the substrate. The mapped intensity metric is determined to mimic the determination of the intensity metric for a manufacturing system, but using the reference system. This may facilitate a comparison of data from different manufacturing systems.

By way of a non-limiting example, the intensity metric may be associated with overlay measured as part of a semiconductor manufacturing process, and the mapped intensity metric may be associated with a mapped overlay, such that the mapped overlay can be compared to other mapped overlays from other manufacturing systems also associated with the semiconductor manufacturing process. In some embodiments, the intensity metric is an intensity in an intensity-image (pupil), an intensity image itself, an intensity map, a set of intensity values, and/or other intensity metrics. A mapped overlay (for comparison with other overlay values measured by other manufacturing systems) may be determined by taking all these intensities together (in a linear or non-linear way) with certain weight-factors (e.g., as described below). Overlay is not necessarily associated with a single point in a pupil.

The present system(s) and method(s) make use of the Jones Framework. The Jones framework describes the propagation of polarized light through an optical system in terms of Jones matrices. A Jones matrix of an optical element, J, is a 2×2 complex matrix that acts on a 2×1 electric field input-vector $E_{in}$ to produce a 2×1 electric field output-vector $E_{out}$ according to $E_{out}=JE_{in}$. Each electric field E is expressed as a linear combination of two chosen orthogonal unit-(field-) vectors that span a 2D subspace perpendicular to the propagation direction of the light. Said unit vectors constitute the local polarization directions of the light. The Jones matrix of an optical system is the matrix product of the Jones matrices of the associated optical elements.

The reference system has a reference system characteristic and/or other associated information. In some embodiments, the reference system characteristic is a matrix (or a plurality of matrices) that comprises calibration data for the reference system and/or other information. In some embodiments, the reference system characteristic is one or more matrices and/or other arrangements of characteristics that comprise calibration data and/or other data for the manufacturing system. The reference system matrix (or matrices) may include any data that may be uniquely associated with the reference system so that any variation caused by a reference system itself is represented in, and/or otherwise accounted for by, the reference system matrix (or matrices).

The mapped intensity metric is determined based on the intensity metric, the manufacturing system characteristic, the reference system characteristic, and/or other information. In some embodiments, the manufacturing system matrix and the reference system matrix form a transform matrix. The components of the transform matrix "T" are determined by the system matrices of the manufacturing system(s) and the matrices of the reference system.

Figure 7:
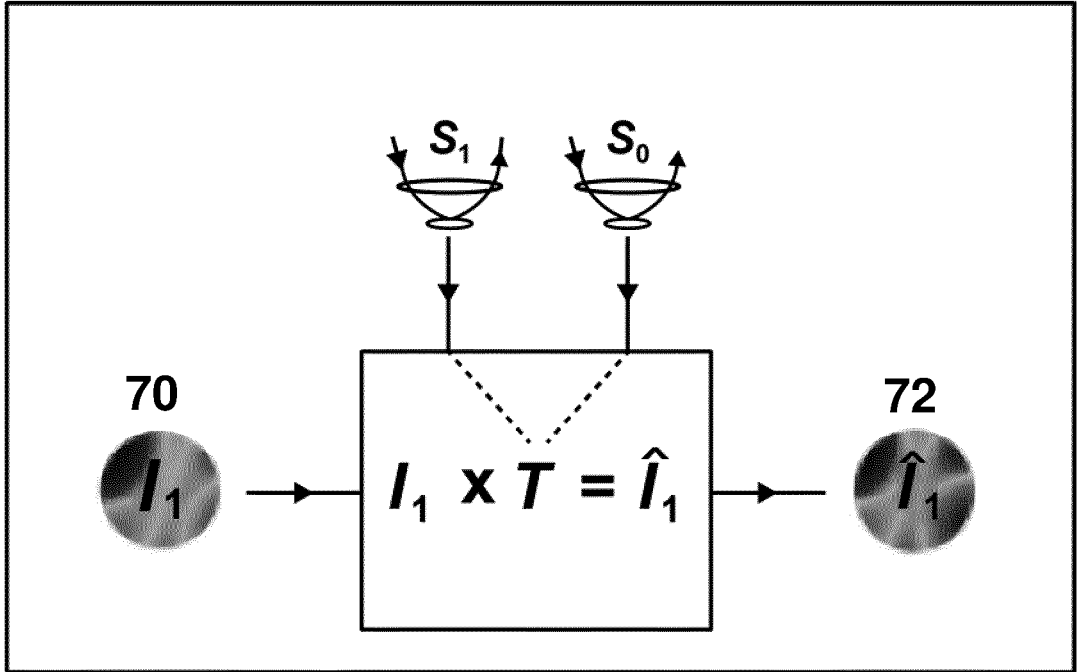
FIG. 7 illustrates mapping (e.g., determining a mapped intensity metric) based on a transformation matrix, according to an embodiment.

FIG. 7 illustrates mapping (e.g., determining a mapped intensity metric) based on a transformation matrix T. The components of the transform matrix T (e.g., $S_1$ and $S_0$ in this example) include the system characteristics (e.g., the matrices and/or other characteristics) of the manufacturing system and the reference system. As described herein, the characteristics and/or the matrices comprise calibration data for the individual systems and/or other information. In some embodiments, a matrix may comprise a 4×4 matrix for individual points on a pupil. In some embodiments, the calibration data may be obtained electronically from a system itself (e.g., for the manufacturing system), programmed by a user (e.g., for the reference system), and/or determined in other ways. As shown in FIG. 7, in some embodiments, a given intensity metric 70 (e.g., $I_1$) may be multiplied by the transformation matrix T to determine a mapped intensity metric 72.

In some embodiments, determining the mapped intensity metric comprises a linear transform of measured channel intensities. In some embodiments, determining the mapped intensity metric comprises combining pointwise linear transforms of measured channel intensities. Individual measurement channels may be characterized by an incoming-outgoing polarization, a grating to sensor rotation, a wavelength, and/or other parameters. Polarized light comprises a light wave that is vibrating in a single plane. Light may be polarized with a filter and/or with other components. Polarized light comprises a light wave of which the electric field vector oscillates in a single direction (linear polarization) or in a rotating fashion (circular or elliptical polarization). In the case of linearly polarized light, a direction attribute, e.g. H, V, S or P, is used to specify the direction. In the case of circular or elliptical polarized light, a rotational sense and/or ellipticity attribute is used to specify the light. In some embodiments, a grating to sensor rotation may comprise an azimuthal angle between a substrate and a sensor in a manufacturing system used to measure reflectivity, intensity, and/or other parameters. The wavelength may refer to the wavelength of light used by the manufacturing system for measuring the reflectivity, intensity, and/or other parameters.

The incoming-outgoing linear polarization comprises horizontal (in) horizontal (out) (H-H), vertical horizontal (V-H), horizontal vertical (H-V), and/or vertical vertical (V-V). The polarization attribute H or V refers to the linear polarization direction of the light as it (e.g., virtually) travels through the pupil plane of the objective. The H-direction refers to a first chosen direction in the pupil plane. The V direction refers to a second direction perpendicular to the first direction. Said filters to select incoming and outgoing H and V polarizations are aligned accordingly. In some embodiments, the incoming-outgoing linear polarization comprises S-P, where S ("Senkrecht") and P (Parallel) form machine independent polarization directions. The S and P polarization directions are defined in relation to the plane spanned by the incoming and outgoing light directions on/from the target. The S direction refers to a first direction perpendicular to said plane. The P direction associated with the incoming light is perpendicular to said S direction and perpendicular to the propagation direction of the incoming light. The P direction associated with the outgoing light is perpendicular to said S direction and perpendicular to the propagation direction of the outgoing light. In some embodiments, the grating to sensor rotation comprises a set of given angles (these can be any angles whatsoever), and the set of given angles plus 180 degrees.

Figure 8:
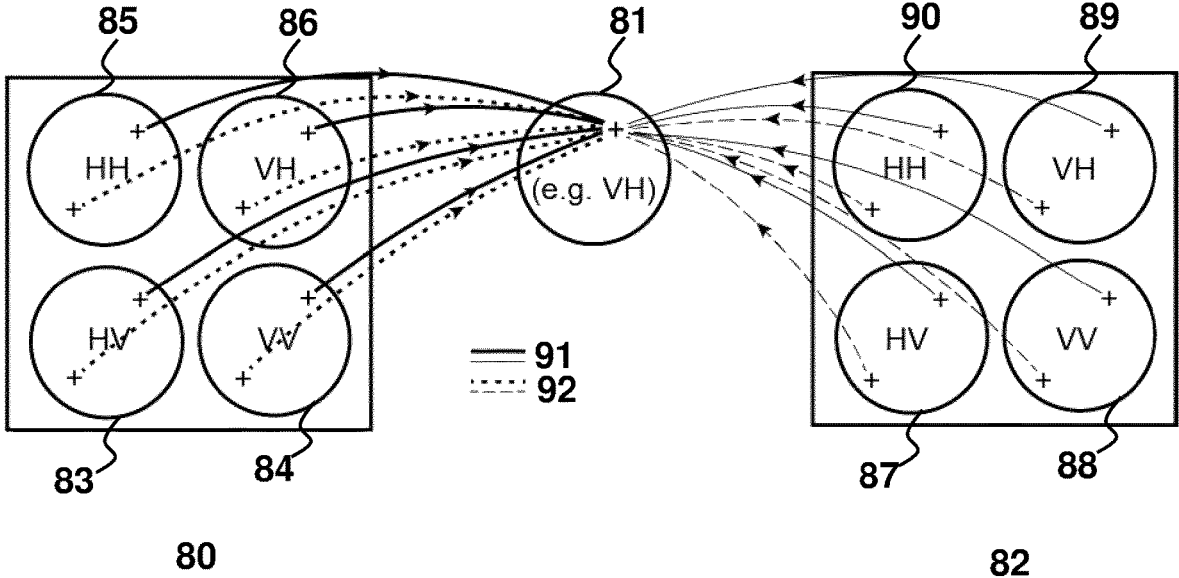
FIG. 8 illustrates mapping individual intensities directly from different points on a pupil, and mapping corresponding intensities from reciprocal points on the pupil, according to an embodiment.

In some embodiments, determining the mapped intensity metric comprises mapping individual intensities directly from different points on a pupil, and mapping corresponding intensities from reciprocal points on the pupil. For example, FIG. 8 illustrates mapping individual intensities directly from different points 80 on a pupil, and mapping corresponding intensities from reciprocal points 82 on the pupil. FIG. 8 shows two sets of points 80 and 82 for four pupils 83, 84, 85, 86, 87, 88, 89, 90 (each pupil in each set labeled individually) at grating-to-sensor rotations (GTS) of 0 (e.g., set of points 80) and 180 degrees (e.g., set of points 82), for a certain wavelength of light. In this example, the mapped pupil (intensity) 81 (e.g., the mapped intensity metric) is HV (H-in, V-out). In this example, it is assumed that diffraction orders are absent. As shown in FIG. 8, in total, 16 points may contribute in determining the indicated mapped pupil point: the 8 "direct" points 91, being at the same position in the pupil as the mapped point, and the 8 "reciprocal" points 92 being at the opposite position in the pupil. The reciprocal points 92 can be included in the mapping because of reciprocity relations that hold if the direction is reversed. These relations hold in the reflectivity domain.

In some embodiments, determining the mapped intensity metric comprises weighting the intensities directly mapped from the different points on the pupil, and the corresponding intensities from the reciprocal points on the pupil. The weighting is based on the calibration data in the manufacturing system matrix and/or the reference system matrix, a corresponding vectorized form of the reflectivity (as described below), and/or other information. Individual weights are determined based on an incoming polarization, an outgoing polarization, a grating to sensor rotation, a reciprocity, a diffraction order, and/or other parameters associated with a given intensity metric.

For example, the individual mapped points indicated by arrows shown in FIG. 8 may contribute different weights to the mapped intensity metric 81. The weights may depend on the calibration data in the manufacturing and/or reference system matrix S. Individual weights may be adjusted by a user and/or have other characteristics. Continuing with this example, the same connections, but with different weights, may be made if a different pupil point is chosen for mapping, e.g. HH. It should be noted that all measured pupils (e.g., co-pol and cross-pol) may be involved in a given mapping. As illustrated in FIG. 8, two types of points are involved: direct points 91 and reciprocal points 92. Also, more than one grating-to-sensor rotation may be involved.

FIG. 9 shows relations 94 and 95 between reflectivity R and intensity I (e.g., an intensity metric). Relation 94 is directly expressed in terms of 2×2 Hermitian density matrices $\rho_{in}$ and $M_{out}$, which include the calibration data for the manufacturing system that generated the intensity (e.g., intensity metric). In the expression for I, the manufacturing system state is entangled with the reflectivity R. The system state is characterized/made-up by $\rho_{in}$ and $M_{out}$. By "entangled", we mean that in this equation they appear as two separate entities as a product with "R" in between. A single matrix S that combines both $\rho_{in}$ and $M_{out}$ in a single entity enables making linear combinations, for example. In these expressions, "†" stands for "conjugate transpose", or "Hermitian transpose". "T" stands for "transpose". Relation 94 can be written into the form shown in relation 95, using the (manufacturing) system matrix S, being the Kronecker product of $\rho_{in}$ and $M_{out}$. Now S has become a 4×4 Hermitian matrix, and r is the vectorized form of the reflectivity R. Note that $\rho_{in}$ and $M_{out}$, and hence S depend on incoming polarization, outgoing polarization, grating-to-sensor rotation, diffraction order, etc.

If $$r = \begin{pmatrix} r1 \\ r2 \\ r3 \\ r4 \end{pmatrix}$$

then $r^\dagger = (r1, r2, r3, r4)^*$, with $*$ denoting the complex conjugate. (r4

As a reminder, in relation 95, intensity I (e.g., an intensity metric) is determined by a manufacturing system (e.g., as described above), S is a system matrix (e.g., comprising one or more manufacturing characteristics as appropriate), and the reflectivity r is unknown (and need not be known). An advantage of using the system matrix S is that the (manufacturing) system properties only enter into the mathematics once, and in a linear way. This enables making linear combinations of sets of equations, even if the actual reflectivity R or r is unknown.

FIG. 9 shows a mathematical principle associated with the present method(s) and system(s). In relation 95, the system matrix S is "anonymous". In reality it is associated with an incoming polarization, an outgoing polarization, a grating-to-sensor rotation, reciprocity, a diffraction order, and/or other calibration information. An additional label may be provided to indicate whether S is from the refence system ("ref" label) or from a manufacturing system (no label). Similarly, the intensity I may be labelled with incoming polarization, outgoing polarization, grating-to-sensor rotation, and/or other calibration information. A "ref" label may indicate a mapped intensity (metric), i.e. the intensity (metric) that would have been expected to be determined on the reference system.

In this example, only the incoming and outgoing polarizations are used and it is assumed that four pupils are measured: HH, HV, VH, and VV. Reciprocity is not taken into account in this example. The four mapped pupils with the same polarization labels (and label "ref") are determined. There are four expressions (a, b, c, d) corresponding to the four polarization states of I. Taking linear combinations of these equations comprises taking linear combinations of the manufacturing system matrix S (or matrices) on one side (without the need to know r), and the same linear combinations of I on the other side. For each mapped polarization label the linear combinations are sought such that the resulting combination of the actual system matrices S approaches the corresponding reference system matrix with that same mapped polarization label (HH in the example). The linear combination can be optimized for instance with respect to a minimal Frobenius norm of the difference between the combination of manufacturing system matrices and the corresponding reference system matrix. Also other choices can be made. Finally, the linear combination is applied to the intensities I to yield the mapped (or "reference") intensity. Carrying out the procedure for other mapped polarization labels gives the mapping matrix T that transforms measured intensities to mapped intensities. The mapping operation (e.g., operation 54 shown in FIG. 5—determining the mapped intensity metric) is a pointwise operation involving points at the same pupil-position and in the more generic case also from the opposite (reciprocal) position.

In some embodiments, a "default" use case for the present system(s) and method(s) may be to map to a reference system that somehow resembles the actual manufacturing systems used. Typically, an idealized version of such a system is taken for reference. However, the principles described herein can also be used to define a (hypothetical and/or virtual) refence system that may be difficult to make in reality. In doing so it may be possible to extract intrinsic (semiconductor manufacturing) stack properties that virtually do not depend on any physical manufacturing system. The intrinsic optical stack properties are usually expressed in terms of a complex reflectivity matrix. The elements of this matrix act on the S and P polarization components of the light, where S ("Senkrecht") and P (Parallel) form machine independent polarization directions, only depending on the direction of the incoming/outgoing light.

Figure 10B:
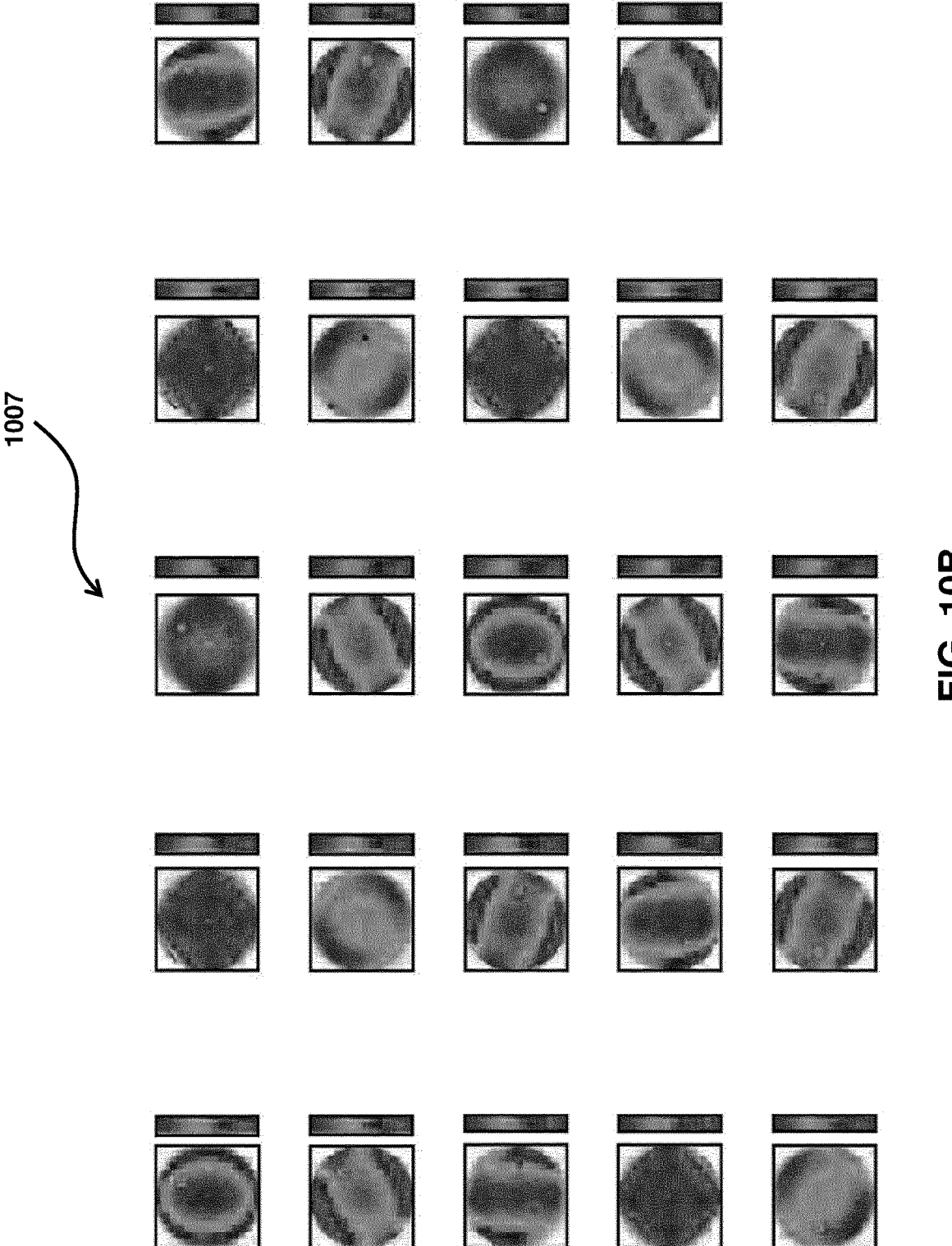
FIG. 10B shows an example of input pupils (e.g., pupil intensity images which can be the intensity metrics described herein), according to an embodiment.
Figure 10C:
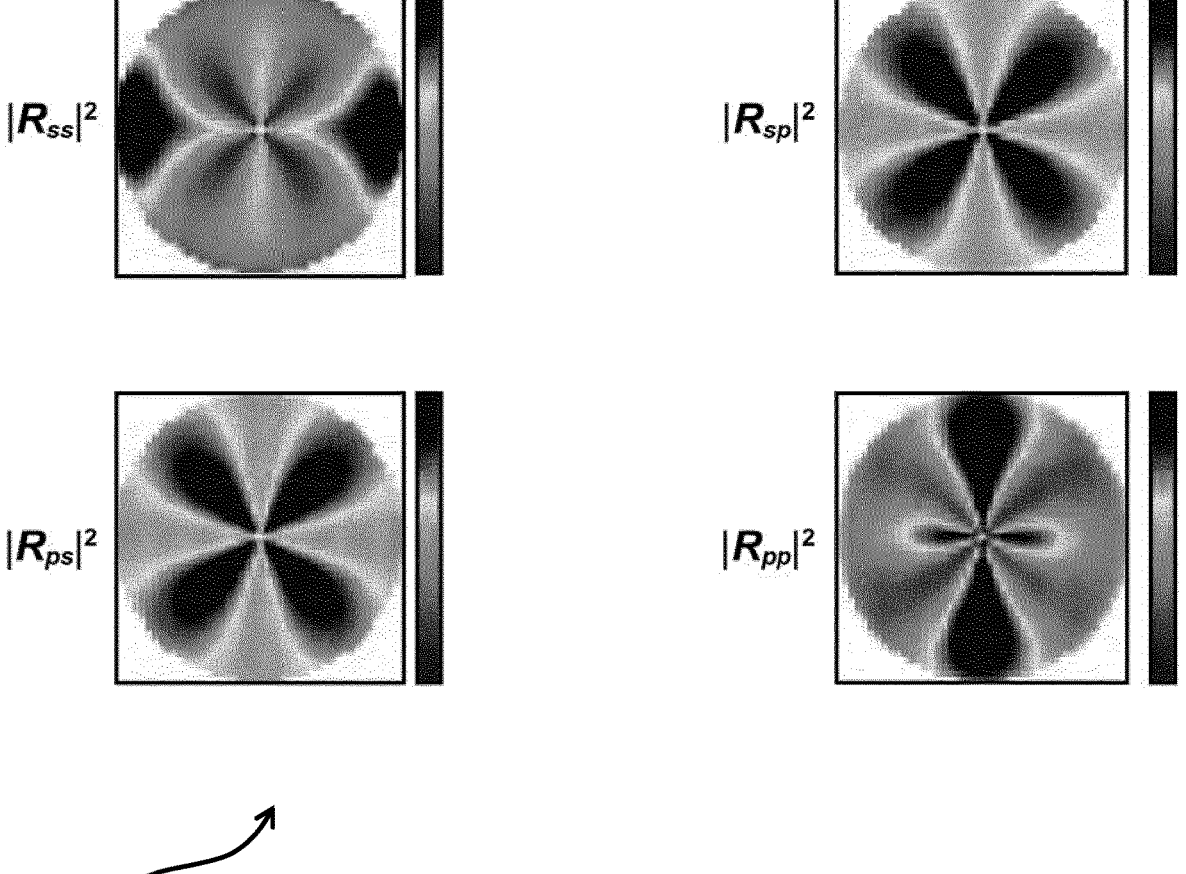
FIG. 10C shows resulting reflectivity components after mapping, according to an embodiment.

FIG. 10A shows an example of a set 1005 of reference system S matrices that, if mapped to, directly provide the norm(s) of the reflectivity matrix in an SP base. For example, $S_1$ is associated with an S-S polarization, $S_2$ is associated with a P-S polarization, $S_3$ is associated with an S-P polarization, and $S_4$ is associated with a P-P polarization. An example of input pupils 1007 (e.g., pupil intensity images which can be the intensity metrics described herein) is shown in FIG. 10B. Note that the pupil-set contains all HH, HV, VH, VV polarizations and six grating-to-sensor rotations: 0, 21, 67, 180, 201 and 247 degrees. FIG. 10C shows the resulting reflectivity components 1009 after mapping.

Returning to FIG. 5, as described above, the operations of method 50 are intended to be illustrative. In some embodiments, method 50 may be accomplished with one or more additional operations not described, and/or without one or more of the operations discussed. For example, in some embodiments, method 50 may include retrieving (e.g., electronically accessing, downloading, receiving an electronic communication, etc.) a manufacturing system matrix (e.g., comprising first calibration data for a manufacturing system) and/or a reference system matrix (e.g., comprising second calibration data for a virtual system), determining a reflectivity of a location on a substrate for the manufacturing system, comparing a mapped intensity metric from one manufacturing system to a corresponding mapped intensity metric from a different manufacturing system, and/or other operations.

Figure 11:
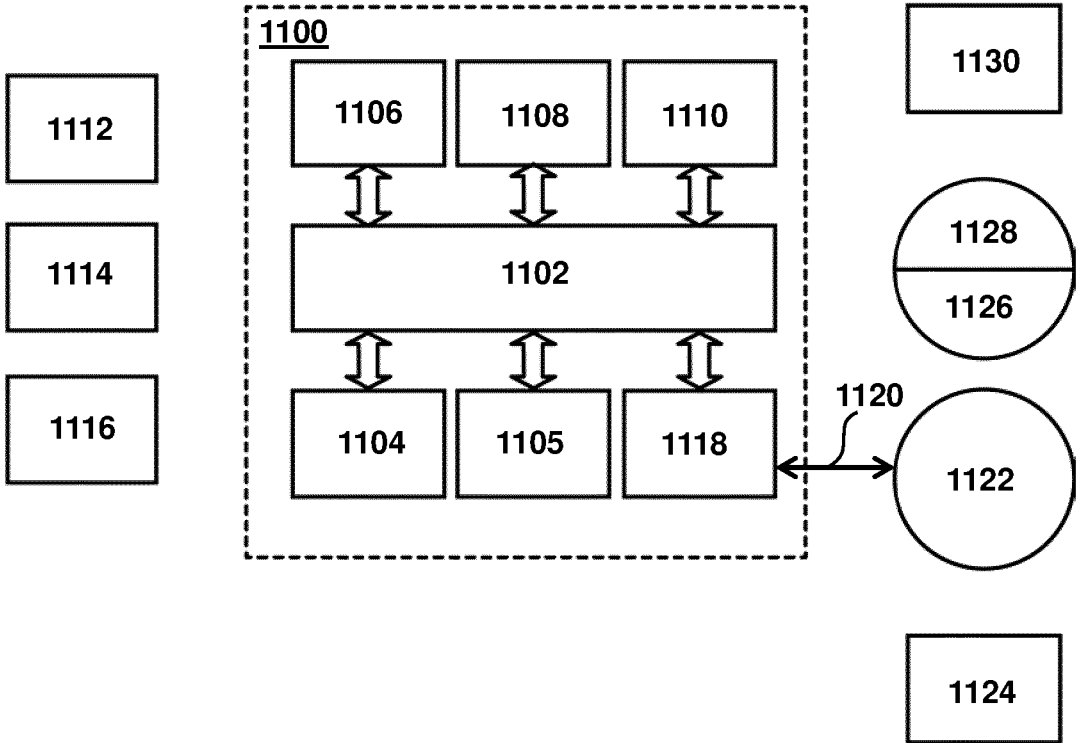
FIG. 11 is a block diagram of an example computer system, according to an embodiment.

FIG. 11 is a block diagram that illustrates a computer system 1100 that can perform and/or assist in implementing the methods, flows, systems or the apparatus disclosed herein. Computer system 1100 includes a bus 1102 or other communication mechanism for communicating information, and a processor 1104 (or multiple processors 1104 and 1105) coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT) or flat panel or touch panel display for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of one or more methods described herein may be performed by computer system 1100 in response to processor 1104 executing one or more sequences of one or more instructions contained in main memory 1106. Such instructions may be read into main memory 1106 from another computer-readable medium, such as storage device 1110. Execution of the sequences of instructions contained in main memory 1106 causes processor 1104 to perform the process steps described herein. One or more processors in a multi-processing arrangement may also be employed to execute the sequences of instructions contained in main memory 1106. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 1104 for execution. Such a medium may take many forms, including but not limited to, non-volatile media, volatile media, and transmission media. Non-volatile media include, for example, optical or magnetic disks, such as storage device 1110. Volatile media include dynamic memory, such as main memory 1106. Transmission media include coaxial cables, copper wire and fiber optics, including the wires that comprise bus 1102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1104 for execution. For example, the instructions may initially be borne on a magnetic disk of a remote computer. The remote computer can load the instructions into its dynamic memory and send the instructions over a telephone line using a modem. A modem local to computer system 1100 can receive the data on the telephone line and use an infrared transmitter to convert the data to an infrared signal. An infrared detector coupled to bus 1102 can receive the data carried in the infrared signal and place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 may also include a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the worldwide packet data communication network, now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120, and communication interface 1118. In the Internet example, a server 1130 might transmit a requested code for an application program through Internet 1128, ISP 1126, local network 1122 and communication interface 1118. One such downloaded application may provide all or part of a method described herein, for example. The received code may be executed by processor 1104 as it is received, and/or stored in storage device 1110, or other non-volatile storage for later execution. In this manner, computer system 1100 may obtain application code in the form of a carrier wave.

Figure 12:
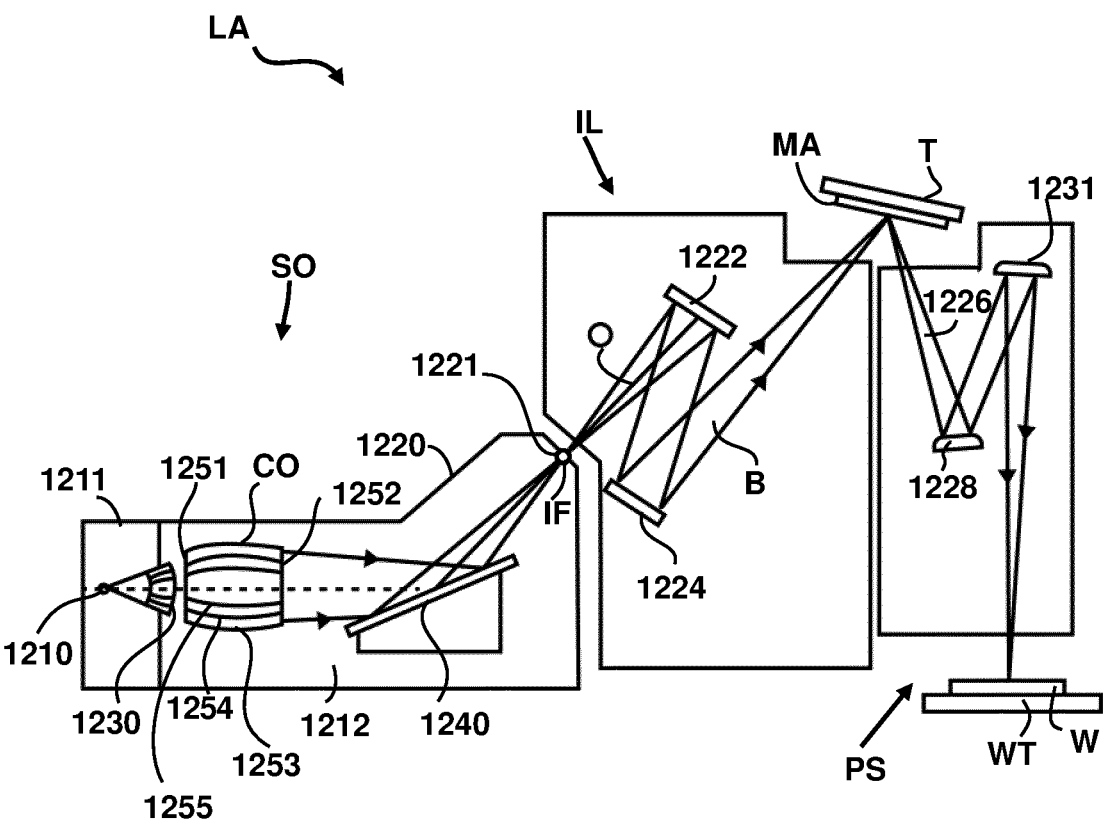
FIG. 12 is an alternative design for the lithography apparatus of FIG. 1, according to an embodiment.

FIG. 12 is a detailed view of an alternative design for the lithographic projection apparatus LA shown in FIG. 1. (FIG. 1 relates to DUV radiation because lenses are used and a transparent reticle is used, while FIG. 11 relates to a lithographic apparatus which uses EUV radiation because mirrors and a reflective reticle are used.) As shown in FIG. 11, the lithographic projection apparatus can include the source SO, the illumination system IL, and the projection system PS. The source SO is configured such that a vacuum environment can be maintained in an enclosing structure 1220 of the source SO. An EUV (for example) radiation emitting plasma 1210 may be formed by a discharge produced plasma source. EUV radiation may be produced by a gas or vapor, for example Xe gas, Li vapor or Sn vapor in which plasma 1210 is created to emit radiation in the EUV range of the electromagnetic spectrum. The plasma 1210 is created by, for example, an electrical discharge causing at least partially ionized plasma. Partial pressures of, for example, 10 Pa of Xe, Li, Sn vapor or any other suitable gas or vapor may be required for efficient generation of the radiation. In some embodiments, a plasma of excited tin (Sn) is provided to produce EUV radiation.

The radiation emitted by plasma 1210 is passed from a source chamber 1211 into a collector chamber 1212 via an optional gas barrier or contaminant trap 1230 (in some cases also referred to as contaminant barrier or foil trap) which is positioned in or behind an opening in source chamber 1211. The contaminant trap 1230 may include a channel structure. Chamber 1211 may include a radiation collector CO which may be a grazing incidence collector, for example. Radiation collector CO has an upstream radiation collector side 1251 and a downstream radiation collector side 1252. Radiation that traverses collector CO can be reflected off a grating spectral filter 1240 to be focused in a virtual source point IF along the optical axis indicated by the line 'O'. The virtual source point IF is commonly referred to as the intermediate focus, and the source is arranged such that the intermediate focus IF is located at or near an opening 1221 in the enclosing structure 1220. The virtual source point IF is an image of the radiation emitting plasma 1210.

Subsequently, the radiation traverses the illumination system IL, which may include a facetted field mirror device 1222 and a facetted pupil mirror device 1224 arranged to provide a desired angular distribution of the radiation beam B, at the patterning device MA, as well as a desired uniformity of radiation intensity at the patterning device MA. Upon reflection of the radiation beam B at the patterning device MA, held by the support structure (table) T, a patterned beam 1226 is formed and the patterned beam 1226 is imaged by the projection system PS via reflective elements 1228, 1231 onto a substrate W held by the substrate table WT. More elements than shown may generally be present in illumination optics unit IL and projection system PS. The grating spectral filter 1240 may optionally be present, depending upon the type of lithographic apparatus, for example. Further, there may be more mirrors present than those shown in the figures, for example there may be 1-6 additional reflective elements present in the projection system PS than shown in FIG. 12.

Collector optic CO, as illustrated in FIG. 12, is depicted as a nested collector with grazing incidence reflectors 1253, 1254 and 1255, just as an example of a collector (or collector mirror). The grazing incidence reflectors 1253, 1254 and 1255 are disposed axially symmetric around the optical axis O and a collector optic CO of this type may be used in combination with a discharge produced plasma source, often called a DPP source.

Further embodiments of the present systems and methods are disclosed in the subsequent list of numbered clauses:

1. A non-transitory computer readable medium for enabling virtual systems to mimic processes on manufacturing systems, the medium having instructions thereon, the instructions when executed by a computer causing the computer to:

retrieve a manufacturing system matrix comprising first calibration data for a manufacturing system;

determine a reflectivity of a location on a substrate for the manufacturing system;

determine an intensity metric for the manufacturing system based on the reflectivity and the manufacturing system matrix, wherein the intensity metric represents an intensity associated with the reflectivity from the location on the substrate;

retrieve a virtual system matrix comprising second calibration data for a virtual system, wherein the virtual system is configured to represent a plurality of different manufacturing systems;

determine weights, based on the manufacturing system matrix and the virtual system matrix, for mapping intensity metrics of the manufacturing system to respective intensity metrics of the virtual system; and determine a mapped intensity metric for the virtual system based on the weights and the intensity metric to mimic the determination of the intensity metric on the manufacturing system using the virtual system.

24

2. The medium of clause 1, wherein determining the mapped intensity metric comprises combining pointwise linear transforms of measured channel intensities, with individual measurement channels characterized by an incoming-outgoing polarization, a grating to sensor rotation, and a wavelength.

3. The medium of clause 2, wherein determining the mapped intensity metric comprises mapping individual intensities directly from different points on a pupil, and mapping corresponding intensities from reciprocal points on the pupil.

4. The medium of clause 3, wherein determining the mapped intensity metric comprises weighting the intensities directly mapped from the different points on the pupil, and the corresponding intensities from the reciprocal points on the pupil.

5. The medium of any of clauses 2-4, wherein the incoming-outgoing polarization comprises horizontal horizontal, vertical horizontal, horizontal vertical, and/or vertical vertical; and the grating to sensor-rotation comprises a set of given angles, and the set of given angles plus 180 degrees.

6. A non-transitory computer readable medium having instructions thereon, the instructions when executed by a computer causing the computer to:

determine an intensity metric for a manufacturing system, the intensity metric determined based on a reflectivity of a location on a substrate and a manufacturing system characteristic; and determine a mapped intensity metric for a reference system, the reference system having a reference system characteristic, the mapped intensity metric determined based on the intensity metric for the manufacturing system, the manufacturing system characteristic, and the reference system characteristic, to mimic the determination of the intensity metric for the manufacturing system using the reference system.

7. The medium of clause 6, wherein the manufacturing system characteristic is a matrix that comprises calibration data for the manufacturing system and the reference system characteristic is a matrix that comprises calibration data for the reference system.

8. The medium of clause 6 or 7, wherein the mapped intensity metric comprises an intensity metric that would have been observed on the reference system given the reflectivity of the location on the substrate.

9. The medium of any of clauses 6-8, wherein the reference system is virtual, and the manufacturing system is physical.

10. The medium of any of clauses 6-9, wherein determining the mapped intensity metric comprises combining pointwise linear transforms of measured channel intensities, with individual measurement channels characterized by an incoming-outgoing polarization, a grating to sensor rotation, and a wavelength.

11. The medium of any of clauses 6-10, wherein determining the mapped intensity metric comprises mapping individual intensities directly from different points on a pupil, and mapping corresponding intensities from reciprocal points on the pupil.

12. The medium of clause 11, wherein determining the mapped intensity metric comprises weighting the intensities directly mapped from the different points on the pupil, and the corresponding intensities from the reciprocal points on the pupil, the weighting based on calibration data in a manufacturing system matrix and/or a reference system matrix and a corresponding vectorized form of the reflectivity such that individual weights are based on an incoming polarization, an outgoing polarization, a grating to sensor rotation, a reciprocity, and a diffraction order associated with a given intensity.

13. The medium of any of clauses 10-12, wherein the incoming-outgoing polarization comprises horizontal horizontal, vertical horizontal, horizontal vertical, and/or vertical vertical; and the grating to sensor-rotation comprises a given set of angles, and the given set of angles plus 180 degrees.

14. The medium of clause 13, wherein the manufacturing system matrix and the reference system matrix form a transform matrix.

15. The medium of any of clauses 6-14, wherein the intensity metric is associated with overlay measured as part of a semiconductor manufacturing process, and the mapped intensity metric is associated with a mapped overlay, such that the mapped overlay can be compared to other mapped overlays from other manufacturing systems also associated with the semiconductor manufacturing process.

16. A method for determining a mapped intensity metric, the method comprising:
    determining an intensity metric for a manufacturing system, the intensity metric determined based on a reflectivity of a location on a substrate and a manufacturing system characteristic; and
    determining a mapped intensity metric for a reference system, the reference system having a reference system characteristic, the mapped intensity metric determined based on the intensity metric for the manufacturing system, the manufacturing system characteristic, and the reference system characteristic, to mimic the determination of the intensity metric for the manufacturing system using the reference system.

17. The method of clause 16, wherein the manufacturing system characteristic is a matrix that comprises calibration data for the manufacturing system and the reference system characteristic is a matrix that comprises calibration data for the reference system.

18. The method of clause 16 or 17, wherein the mapped intensity metric comprises an intensity metric that would have been observed on the reference system given the reflectivity of the location on the substrate.

19. The method of any of clauses 16-18, wherein the reference system is virtual, and the manufacturing system is physical.

20. The method of any of clauses 16-19, wherein determining the mapped intensity metric comprises combining pointwise linear transforms of measured channel intensities, with individual measurement channels characterized by an incoming-outgoing polarization, a grating to sensor rotation, and a wavelength.

21. The method of any of clauses 16-20, wherein determining the mapped intensity metric comprises mapping individual intensities directly from different points on a pupil, and mapping corresponding intensities from reciprocal points on the pupil.

22. The method of clause 21, wherein determining the mapped intensity metric comprises weighting the intensities directly mapped from the different points on the pupil, and the corresponding intensities from the reciprocal points on the pupil, the weighting based on calibration data in a manufacturing system matrix and/or a reference system matrix and a corresponding vectorized form of the reflectivity such that individual weights are based on an incoming polarization, an outgoing polarization, a grating to sensor rotation, a reciprocity, and a diffraction order associated with a given intensity.

23. The method of any of clauses 20-22, wherein the incoming-outgoing polarization comprises horizontal horizontal, vertical horizontal, horizontal vertical, and/or vertical vertical; and the grating to sensor-rotation comprises a set of given angles, and the set of given angles plus 180 degrees.

24. The method of clause 23, wherein the manufacturing system matrix and the reference system matrix form a transform matrix.

25. The method of any of clauses 16-24, wherein the intensity metric is associated with overlay measured as part of a semiconductor manufacturing process, and the mapped intensity metric is associated with a mapped overlay, such that the mapped overlay can be compared to other mapped overlays from other manufacturing systems also associated with the semiconductor manufacturing process.

26. A system for determining a mapped intensity metric, the system comprising one or more processors configured by machine readable instructions to:
    determine an intensity metric for a manufacturing system, the intensity metric determined based on a reflectivity of a location on a substrate and a manufacturing system characteristic; and
    determine a mapped intensity metric for a reference system, the reference system having a reference system characteristic, the mapped intensity metric determined based on the intensity metric for the manufacturing system, the manufacturing system characteristic, and the reference system characteristic, to mimic the determination of the intensity metric for the manufacturing system using the reference system.

27. The system of clause 26, wherein the manufacturing system characteristic is a matrix that comprises calibration data for the manufacturing system and the reference system characteristic is a matrix that comprises calibration data for the reference system.

28. The system of clause 26 or 27, wherein the mapped intensity metric comprises an intensity metric that would have been observed on the reference system given the reflectivity of the location on the substrate.

29. The system of any of clauses 26-28, wherein the reference system is virtual, and the manufacturing system is physical.

30. The system of any of clauses 26-29, wherein determining the mapped intensity metric comprises combining pointwise linear transforms of measured channel intensities, with individual measurement channels characterized by an incoming-outgoing polarization, a grating to sensor rotation, and a wavelength.

31. The system of any of clauses 26-30, wherein determining the mapped intensity metric comprises mapping individual intensities directly from different points on a pupil, and mapping corresponding intensities from reciprocal points on the pupil.

32. The system of clause 31, wherein determining the mapped intensity metric comprises weighting the intensities directly mapped from the different points on the pupil, and the corresponding intensities from the reciprocal points on the pupil, the weighting based on calibration data in a manufacturing system matrix and/or a reference system matrix and a corresponding vectorized form of the reflectivity such that individual weights are based on an incoming polarization, an outgoing polarization, a grating to sensor rotation, a reciprocity, and a diffraction order associated with a given intensity.

33. The system of any of clauses 30-32, wherein the incoming-outgoing polarization comprises horizontal horizontal, vertical horizontal, horizontal vertical, and/or vertical vertical; and the grating to sensor-rotation comprises a set of given angles, and the set of given angles plus 180 degrees.

34. The system of clause 33, wherein the manufacturing system matrix and the reference system matrix form a transform matrix.

35. The system of any of clauses 26-34, wherein the intensity metric is associated with overlay measured as part of a semiconductor manufacturing process, and the mapped intensity metric is associated with a mapped overlay, such that the mapped overlay can be compared to other mapped overlays from other manufacturing systems also associated with the semiconductor manufacturing process.

The concepts disclosed herein may simulate or mathematically model any generic imaging system for imaging sub wavelength features, and may be especially useful with emerging imaging technologies capable of producing increasingly shorter wavelengths. Emerging technologies already in use include EUV (extreme ultra violet), DUV lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

While the concepts disclosed herein may be used for imaging on a substrate such as a silicon wafer, it shall be understood that the disclosed concepts may be used with any type of lithographic imaging systems, e.g., those used for imaging on substrates other than silicon wafers, and/or metrology systems. In addition, the combination and sub-combinations of disclosed elements may comprise separate embodiments. For example, predicting a complex electric field image and determining a metrology metric such as overlay may be performed by the same parameterized model and/or different parameterized models. These features may comprise separate embodiments, and/or these features may be used together in the same embodiment.

Although specific reference may be made in this text to embodiments of the invention in the context of a metrology apparatus, embodiments of the invention may be used in other apparatus. Embodiments of the invention may form part of a mask inspection apparatus, a lithographic apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Although specific reference may have been made above to the use of embodiments of the invention in the context of optical lithography, it will be appreciated that the invention, where the context allows, is not limited to optical lithography and may be used in other applications, for example imprint lithography.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

What is claimed is:

1. A non-transitory computer readable medium having instructions thereon or therein, the instructions, when executed by a computer system, configured to cause the computer system to at least:

retrieve a manufacturing system matrix comprising first calibration data for a manufacturing system;

determine a reflectivity of a location on a substrate for the manufacturing system;

determine an intensity metric for the manufacturing system based on the reflectivity and the manufacturing system matrix, wherein the intensity metric represents an intensity associated with the reflectivity from the location on the substrate;

retrieve a virtual system matrix comprising second calibration data for a virtual system, wherein the virtual system is configured to represent a plurality of different manufacturing systems;

determine weights, based on the manufacturing system matrix and the virtual system matrix, for mapping intensity metrics of the manufacturing system to respective intensity metrics of the virtual system; and determine a mapped intensity metric for the virtual system based on the weights and the intensity metric to mimic the determination of the intensity metric on the manufacturing system using the virtual system cause physical configuration or control, based on the mapped intensity metric, of a physical manufacturing process involving the manufacturing system or involving the one or more of the plurality of different manufacturing systems, or provide a signal representing, or based on, the mapped intensity metric to a system for use in configuration or control of the process.

2. The medium of claim 1, wherein the instructions configured to cause the computer system to determine the mapped intensity metric is further configured to cause the computer system to combine pointwise linear transforms of measured channel intensities, with individual measurement channels characterized by an incoming-outgoing polarization, a grating to sensor rotation, and a wavelength.

3. The medium of claim 2, wherein the instructions configured to cause the computer system to determine the mapped intensity metric is further configured to cause the computer system to map individual intensities directly from different points on a pupil, and map corresponding intensities from reciprocal points on the pupil.

4. A non-transitory computer readable medium having instructions therein or thereon, the instructions, when executed by a computer system, configured to cause the computer system to at least:

determine an intensity metric for a manufacturing system, the intensity metric determined based on a reflectivity of a location on a substrate and a manufacturing system characteristic;

determine a mapped intensity metric for a reference system, the reference system configured to represent a plurality of different manufacturing systems, the reference system having a reference system characteristic, the mapped intensity metric determined based on the intensity metric for the manufacturing system, the manufacturing system characteristic, and the reference system characteristic, to mimic determination of the intensity metric for the manufacturing system using the reference system; and cause physical configuration or control, based on the mapped intensity metric, of a physical manufacturing process involving the manufacturing system or involving the one or more of the plurality of different manufacturing systems, or provide a signal representing, or based on, the mapped intensity metric to a system for use in configuration or control of the process.

5. The medium of claim 4, wherein the manufacturing system characteristic is a matrix that comprises calibration data for the manufacturing system and the reference system characteristic is a matrix that comprises calibration data for the reference system.

6. The medium of claim 4, wherein the mapped intensity metric comprises an intensity metric that would have been observed on the reference system given the reflectivity of the location on the substrate.

7. The medium of claim 4, wherein the reference system is virtual, and the manufacturing system is physical.

8. The medium of claim 4, wherein the instructions configured to cause the computer system to determine the mapped intensity metric are further configured to cause the computer system to combine pointwise linear transforms of measured channel intensities, with individual measurement channels characterized by an incoming-outgoing polarization, a grating to sensor rotation, and a wavelength.

9. The medium of claim 4, wherein the instructions configured to cause the computer system to determine the mapped intensity metric are further configured to cause the computer system to map individual intensities directly from different points on a pupil, and map corresponding intensities from reciprocal points on the pupil.

10. The medium of claim 9, wherein the instructions configured to cause the computer system to determine the mapped intensity metric are further configured to cause the computer system to weigh the intensities directly mapped from the different points on the pupil, and the corresponding intensities from the reciprocal points on the pupil, the weighting based on calibration data in (i) a manufacturing system matrix, or (ii) in a reference system matrix, or (iii) both (i) and (ii), and a corresponding vectorized form of the reflectivity such that individual weights are based on an incoming polarization, an outgoing polarization, a grating to sensor rotation, a reciprocity, and a diffraction order associated with a given intensity.

11. The medium of claim 4, wherein the intensity metric is associated with overlay measured as part of a semiconductor manufacturing process, and the mapped intensity metric is associated with a mapped overlay, such that the mapped overlay can be compared to other mapped overlays from other manufacturing systems also associated with the semiconductor manufacturing process.

12. A method for determining a mapped intensity metric, the method comprising:

determining an intensity metric for a manufacturing system, the intensity metric determined based on a reflectivity of a location on a substrate and a manufacturing system characteristic;

determining a mapped intensity metric for a reference system, the reference system configured to represent a plurality of different manufacturing systems, the reference system having a reference system characteristic, the mapped intensity metric determined based on the intensity metric for the manufacturing system, the manufacturing system characteristic, and the reference system characteristic, to mimic determination of the intensity metric for the manufacturing system using the reference system; and physically configuring or controlling a physical manufacturing process involving the manufacturing system and/or one or more of the plurality of different manufacturing systems based on the mapped intensity metric, or providing a signal representing, or based on, the mapped intensity metric to a system for use in configuration or control of the process.

13. The method of claim 12, wherein the manufacturing system characteristic is a matrix that comprises calibration data for the manufacturing system and the reference system characteristic is a matrix that comprises calibration data for the reference system.

14. The method of claim 12, wherein the mapped intensity metric comprises an intensity metric that would have been observed on the reference system given the reflectivity of the location on the substrate.

15. The method of claim 12, wherein the reference system is virtual, and the manufacturing system is physical.

16. The method of claim 12, wherein determining the mapped intensity metric comprises combining pointwise linear transforms of measured channel intensities, with individual measurement channels characterized by an incoming-outgoing polarization, a grating to sensor rotation, and a wavelength.

17. The method of claim 12, wherein determining the mapped intensity metric comprises mapping individual intensities directly from different points on a pupil, and mapping corresponding intensities from reciprocal points on the pupil.

18. The method of claim 17, wherein determining the mapped intensity metric comprises weighting the intensities directly mapped from the different points on the pupil, and the corresponding intensities from the reciprocal points on the pupil, the weighting based on calibration data in (i) a manufacturing system matrix, or (ii) in a reference system matrix, or (iii) both (i) and (ii), and a corresponding vectorized form of the reflectivity such that individual weights are based on an incoming polarization, an outgoing polarization, a grating to sensor rotation, a reciprocity, and a diffraction order associated with a given intensity.

19. The method of claim 12, wherein a manufacturing system matrix and a reference system matrix form a transform matrix.

20. The method of claim 12, wherein the intensity metric is associated with overlay measured as part of a semiconductor manufacturing process, and the mapped intensity metric is associated with a mapped overlay, such that the mapped overlay can be compared to other mapped overlays from other manufacturing systems also associated with the semiconductor manufacturing process.

* * * * *